(12) United States Patent
Masuda

(10) Patent No.: US 8,294,762 B2
(45) Date of Patent: Oct. 23, 2012

(54) THREE-DIMENSIONAL SHAPE MEASUREMENT PHOTOGRAPHING APPARATUS, METHOD, AND PROGRAM

(75) Inventor: Tomonori Masuda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 519 days.

(21) Appl. No.: 12/576,600

(22) Filed: Oct. 9, 2009

(65) Prior Publication Data

US 2010/0091301 A1    Apr. 15, 2010

(30) Foreign Application Priority Data

Oct. 10, 2008 (JP) .................................. 2008-263385
Oct. 10, 2008 (JP) .................................. 2008-263386

(51) Int. Cl.
*H04N 9/47*       (2006.01)
*G06K 9/00*       (2006.01)
*G01B 11/30*      (2006.01)

(52) U.S. Cl. .......................... 348/135; 382/154; 356/608
(58) Field of Classification Search ................. 348/135; 382/154; 356/608
See application file for complete search history.

(56) References Cited

U.S. PATENT DOCUMENTS

| | | | |
|---|---|---|---|
| 6,287,647 B1 | 9/2001 | Kobayashi et al. | |
| 6,980,302 B2 * | 12/2005 | Knighton et al. | 356/607 |
| 7,256,899 B1 * | 8/2007 | Faul et al. | 356/623 |
| 7,750,969 B2 * | 7/2010 | Sato et al. | 348/335 |
| 7,768,656 B2 * | 8/2010 | Lapa et al. | 356/603 |
| 7,880,899 B2 * | 2/2011 | Horita et al. | 356/608 |
| 8,103,331 B2 * | 1/2012 | Hoyt et al. | 600/476 |
| 2005/0007487 A1 | 1/2005 | Miyoshi et al. | |

FOREIGN PATENT DOCUMENTS

| | | |
|---|---|---|
| JP | 2000-283752 | 10/2000 |
| JP | 2001-159506 | 6/2001 |
| JP | 2002-300605 | 10/2002 |
| JP | 2006-177737 | 7/2006 |
| JP | 2008-232776 | 10/2008 |

OTHER PUBLICATIONS

First Notification of Grounds for Rejection dated Apr. 10, 2012, with English translation.
First Notification of Grounds for Rejection dated Jun. 5, 2012, with English translation.

* cited by examiner

*Primary Examiner* — Larry Donaghue
(74) *Attorney, Agent, or Firm* — McGinn IP Law Group, PLLC

(57) ABSTRACT

A three-dimensional shape measurement photographing apparatus, including a plurality of photographing units for obtaining a measurement image group of a plurality of measurement images for measuring a three-dimensional shape of a subject, an emission unit for emitting light, including pattern light, within an angle of view of the photographing units, a photographing control unit for controlling the photographing units to obtain a pre-image of the subject before obtaining the measurement image group and to obtain the measurement images of the subject illuminated by the pattern light, a determination unit for setting a plurality of areas on the pre-image and determining whether to emit the pattern light with respect to each of the areas, and an emission control unit for controlling the emission unit such that the pattern light is emitted only to an area for which a determination has been made to emit the pattern light.

15 Claims, 17 Drawing Sheets

FIG.13

THREE-DIMENSIONAL SHAPE MEASUREMENT PHOTOGRAPHING APPARATUS, METHOD, AND PROGRAM

BACKGROUND OF THE INVENTION

1. Field of the Invention

The present invention relates to a three-dimensional shape measurement photographing apparatus and method for obtaining a measurement image for measuring a three-dimensional shape of a subject. The invention also relates to a computer recording medium on which is recorded a program for causing a computer to perform the three-dimensional shape measurement photographing method.

2. Description of the Related Art

In distance measurement methods generally called as stereo methods or three-dimensional image measurement methods, a subject is photographed using at least two cameras (one base camera and the other reference camera) placed at different positions, then pixel matching is performed between a plurality of obtained measurement images (base image obtained by the base camera and reference image obtained by the reference camera), and the principle of triangulation is applied to the positional difference (parallax) between a pixel on the base image and a pixel on the reference image related to each other, whereby the distance from the base or reference camera to the point on the subject corresponding to the pixel is measured.

Therefore, if the distances to all pixels corresponding to the entire surface of a subject are measured, a three-dimensional shape of the subject such as the shape, depth, and the like may be obtained. It is also possible to measure a three-dimensional shape of a subject with a single camera by photographing the subject at different positions and obtaining a plurality of images.

In the stereo method, as illustrated in FIG. 20, pixel matching is performed based on the fact that there exists a plurality of points in real space which are mapped to a certain pixel Pa of base image G1, such as points P1, P2, P3, and the like along a visual line from point C, and point Pa' of reference image G2 corresponding to point Pa exists on a straight line (epipolar line) representing mapped images of points P1, P2, P3, and the like. In FIG. 20, point C is a viewpoint of the base camera and point C' is a viewpoint of the reference camera.

The stereo method, however, has a problem that when a subject does not have any local characteristic like, for example, human face contrast, shape, color or the like, corresponding points can not be obtained by pixel matching. In order to solve the problem, a method in which pattern light, such as random dot pattern, grid pattern, barcode pattern, or the like is emitted on a subject and corresponding points are obtained based on the position of the pattern light is proposed as described, for example, in U.S. Patent Application Publication No. 20050007487 and Japanese Unexamined Patent Publication No. 2000-283752.

Further, a method that measures the contrast of a subject and determines whether to emit pattern light based on measurement results is also proposed as described, for example, in Japanese Unexamined Patent Publication No. 2002-300605.

The method described in Japanese Unexamined Patent Publication No. 2002-300605, however, determines whether to emit pattern light over the entire range of the angle of view, so that the pattern light is emitted even to a portion having a high contrast or a local characteristic included in the angle of view. Illumination of the pattern light on such a portion having a high contrast or a local characteristic will result in a larger amount of high frequency component in the obtained image. Consequently, a moiré is generated in the image corresponding to the portion and appropriate searching for corresponding points is prevented, thereby causing a problem that an accurate distance measurement to the subject can not be performed.

SUMMARY OF THE INVENTION

The present invention has been developed in view of the circumstances described above, and it is an object of the present invention to accurately measure a three-dimensional shape of a subject using images obtained by illuminating pattern light on the subject.

A first three-dimensional shape measurement photographing apparatus of the present invention is an apparatus, including:

a plurality of photographing units for obtaining, by photographing a subject, a measurement image group constituted by a plurality of measurement images for measuring a three-dimensional shape of the subject;

an emission unit for emitting light, including pattern light, within an angle of view of the photographing units;

a photographing control unit for controlling the photographing units to obtain a pre-image of the subject before obtaining the measurement image group and to obtain the measurement images of the subject illuminated by the pattern light;

a determination unit for setting a plurality of areas on the pre-image and determining, for each of the areas, whether to emit the pattern light; and an emission control unit for controlling the emission unit such that the pattern light is emitted only to an area for which a determination has been made to emit the pattern light.

The first three-dimensional shape measurement photographing apparatus of the present invention may further include a luminance calculation unit for calculating a luminance of the pre-image for each of the plurality of areas, and the emission control unit may be a unit that controls the emission unit such that the amount of light emitted to the subject is changed for each of the areas according to the luminance.

In this case, the emission control unit may be a unit that controls the emission unit such that the pattern light having a predetermined luminance is emitted to an area having a luminance not greater than a predetermined value among the plurality of areas.

Further, the first three-dimensional shape measurement photographing apparatus of the present invention may further include a measuring unit for measuring the three-dimensional shape of the subject based on the measurement image group of the subject illuminated by the pattern light.

A first three-dimensional shape measurement photographing method according to the present invention is a method for use with a three-dimensional shape measurement photographing apparatus that includes a plurality of photographing units for obtaining, by photographing a subject, a measurement image group constituted by a plurality of measurement images for measuring a three-dimensional shape of the subject, and an emission unit for emitting light, including pattern light, within an angle of view of the photographing units, the method including the steps of:

obtaining a pre-image of the subject before obtaining the measurement image group;

setting a plurality of areas on the pre-image and determining, for each of the areas, whether to emit the pattern light;

emitting the pattern light only to an area for which a determination has been made to emit the pattern light;

obtaining the measurement images of the subject illuminated by the pattern light; and measuring the three-dimensional shape of the subject based on the measurement images.

The first three-dimensional shape measurement photographing method may be provided as a program, to be performed by a computer, recorded on a computer readable recording medium.

According to the first three-dimensional shape measurement photographing apparatus and method of the present invention, a pre-image of the subject is obtained before obtaining a measurement image group, then a plurality of areas is set on the pre-image and a determination is made, for each of the areas, whether to emit the pattern light, and pattern light is emitted only to an area for which a determination has been made to emit the pattern light. This may prevent the pattern light from being emitted to a portion having a high contrast or a local characteristic included in the angle of view. Consequently, even when a portion having a high contrast or a local characteristic is included in the angle of view, a high quality measurement image group without a moiré and the like may be obtained and corresponding points may be obtained accurately, whereby a three-dimensional shape of the subject may be measured accurately.

Further, a low luminance area may be brightened by calculating a luminance of the pre-image with respect to each of the plurality of areas, and changing the amount of light emitted to the subject according to the luminance.

Still further, by emitting the pattern light having a predetermine luminance to an area having a luminance not greater than a predetermined value among the plurality of areas, high luminance pattern light may be emitted on a dark portion of the subject without requiring a complicated process.

A second three-dimensional shape measurement photographing apparatus of the present invention is an apparatus, including:

a plurality of photographing units for obtaining, by photographing a subject, a measurement image group constituted by a plurality of measurement images for measuring a three-dimensional shape of the subject;

an emission unit for emitting pattern light within an angle of view of the photographing units;

a photographing control unit for controlling the plurality of photographing units to obtain a pre-image of the subject or to obtain a first measurement image group constituted by a plurality of first measurement images of the subject not illuminated by the pattern light; and a determination unit for setting a plurality of areas on the pre-image or at least on one of the first measurement images and determining, for each of the areas, whether to emit the pattern light.

"Pre-image" is an image not used for three-dimensional shape measurement and, for example, an image with a smaller number of pixels than that of the measurement image may be used.

The second three-dimensional shape measurement photographing apparatus of the present invention may be an apparatus, further including a storage unit for storing a result of the determination.

Further, the second three-dimensional shape measurement photographing apparatus of the present invention may be an apparatus, further including an emission control unit that controls the emission unit to emit pattern light to the subject, and the photographing control unit may be a unit that controls the photographing units to obtain a second measurement image group constituted by a plurality of second measurement images of the subject illuminated by the pattern light.

Still further, the second three-dimensional shape measurement photographing apparatus of the present invention may be an apparatus, further including an emission control unit that controls the emission unit to emit pattern light to the subject, and the photographing control unit may be a unit that controls the photographing units to obtain the second measurement image group constituted by a plurality of second measurement images of the subject illuminated by the pattern light, if an area for which a determination has been made to emit the pattern light is present.

Further, the second three-dimensional shape measurement photographing apparatus of the present invention may be an apparatus, further including a measuring unit for measuring the three-dimensional shape based on the first and second measurement image groups.

Still further, the second three-dimensional shape measurement photographing apparatus of the present invention may be an apparatus, further including a combining unit for extracting a non-illumination area for which a determination has been made not to emit the pattern light from the first measurement image group and an illumination area for which a determination has been made to emit the pattern light from the second measurement image group, and generating a composite image group constituted by a plurality of composite images from the non-illumination area and illumination area extracted from the first and second measurement image groups corresponding to each other.

Further, the second three-dimensional shape measurement photographing apparatus of the present invention may be an apparatus, further including a measuring unit for measuring the three-dimensional shape of the subject based on the composite image group.

A second three-dimensional shape measurement photographing method is a method for use with a three-dimensional shape measurement photographing apparatus that includes a plurality of photographing units for obtaining, by photographing a subject, a measurement image group constituted by a plurality of measurement images for measuring a three-dimensional shape of the subject and an emission unit for emitting pattern light within an angle of view of the photographing units, the method including the steps of:

obtaining a pre-image of the subject or a first measurement image group constituted by a plurality of first measurement images of the subject not illuminated by the pattern light; and setting a plurality of areas on the pre-image or at least on one of the first measurement images and determining, for each of the areas, whether to emit the pattern light.

The second three-dimensional shape measurement photographing method may be provided as a program, to be performed by a computer, recorded on a computer readable recording medium.

According to the second three-dimensional shape measurement photographing apparatus and method of the present invention, a pre-image of a subject or a first measurement image group constituted by a plurality of first measurement images of the subject not illuminated by the pattern light is obtained, then a plurality of areas on the pre-image or at least on one of the first measurement images is set, and a determination is made for each of the areas as to whether to emit the pattern light. Thereafter, a second measurement image group constituted by a plurality of measurement images for measuring a three-dimensional shape of the subject may be obtained by photographing the subject by emitting the pattern light to the subject. Consequently, corresponding points may be searched for using the first measurement image group for a portion having a high contrast or a local characteristic in the angle of view and the second measurement image group for the other portions based on the result of the determination. That is, corresponding points may be obtained accurately using high quality images without a moiré and the like, whereby a three-dimensional shape of the subject may be measured accurately.

Further, when measuring a three-dimensional shape of a subject, storage of determination results allows the acquisition of an illumination area to which pattern light is emitted and a non-illumination area to which the pattern light is not emitted from the first and second measurement image groups respectively, whereby the three-dimensional shape measurement may be performed easily.

Extraction of a non-illumination area for which a determination has been made not to emit the pattern light from the first measurement image group and an illumination area for which a determination has been made to emit the pattern light from the second measurement image group, and generation of a composite image group constituted by a plurality of composite images from the non-illumination area and illumination area extracted from the first and second measurement image groups corresponding to each other allow a portion having a high contrast or a local characteristic included in the angle of view to be an area not illuminated by the pattern light. Consequently, even when a portion having a high contrast or a local characteristic is included in the angle of view, a high quality composite image without a moiré and the like may be obtained and corresponding points may be obtained accurately, whereby a three-dimensional shape of the subject may be measured accurately.

BRIEF DESCRIPTION OF THE DRAWINGS

FIG. 13 illustrates determination results of non-illumination and illumination areas.

DESCRIPTION OF THE PREFERRED EMBODIMENTS

Figure 1:
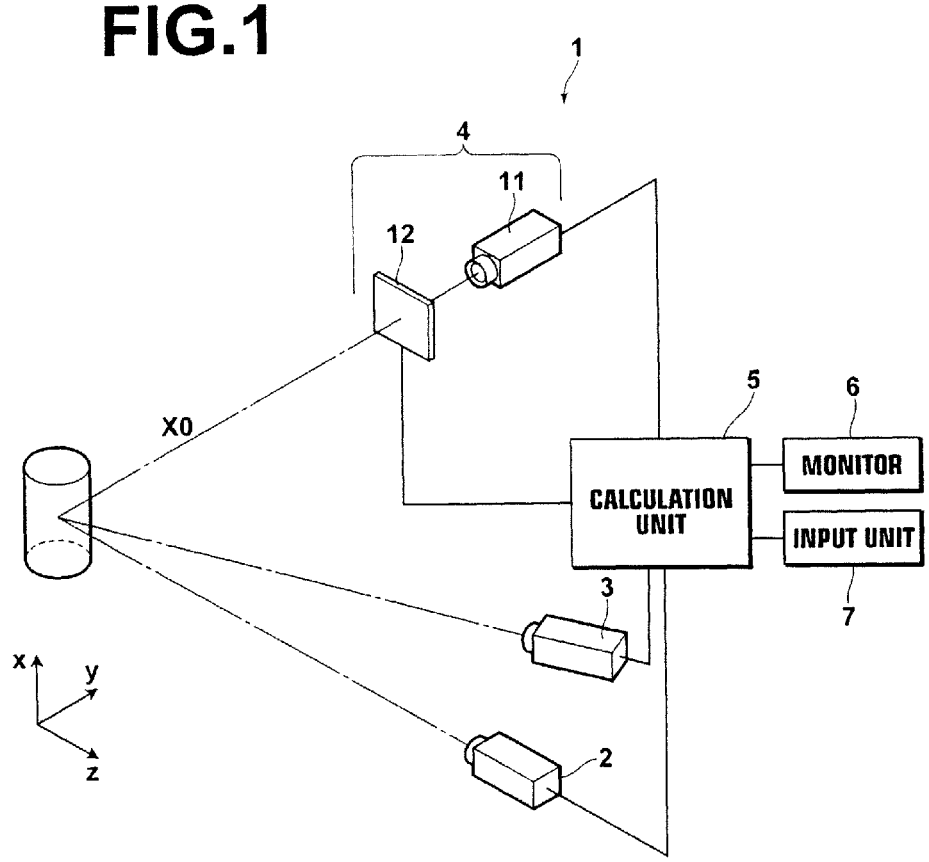
FIG. 1 is an external perspective view of a three-dimensional shape measuring system according to a first embodiment of the present invention.

Hereinafter, exemplary embodiments of the present invention will be described with reference to the accompanying drawings. FIG. 1 is an external perspective view of a three-dimensional shape measuring system incorporating a three-dimensional shape measurement photographing apparatus according to a first embodiment of the present invention. As illustrated in FIG. 1, three-dimensional shape measuring system 1 of the present embodiment includes first camera 2, second camera 3, projector 4, calculation unit 5, monitor 6, and input unit 7.

First and second cameras 2, 3 are placed at a predetermined distance from each other with a predetermined convergence angle, and respectively photograph a subject from different positions in response to an instruction from calculation unit 5 to obtain base image G1 and reference image G2 used for measuring a three-dimensional shape of the subject. Base image G1 and reference image G2 obtained are inputted to calculation unit 5 and used for measuring a three-dimensional shape of the subject. Note that first and second cameras 2, 3 correspond to photographing units.

Projector 4 is a device for emitting pattern light having a predetermined pattern, such as a grid dot pattern or the like, on the subject based on an instruction from calculation unit 5. Projector 4 includes light source 11 for emitting light, such as LED or the like and conversion unit 12 for converting light emitted from light source 11 to pattern light. Note that projector 4 corresponds to an emission unit.

Conversion unit 12 includes a liquid crystal filter disposed in optical path X0 of light emitted from light source 11, and displays a pattern instructed by emission control unit 21, to be described later, to pass light emitted from light source 11 through the pattern, thereby converting the light to a pattern light. The pattern light will be described later.

Calculation unit 5 performs calculations required for measuring a three-dimensional shape of the subject and drive controls first camera 2, second camera 3, and projector 4.

Figure 2:
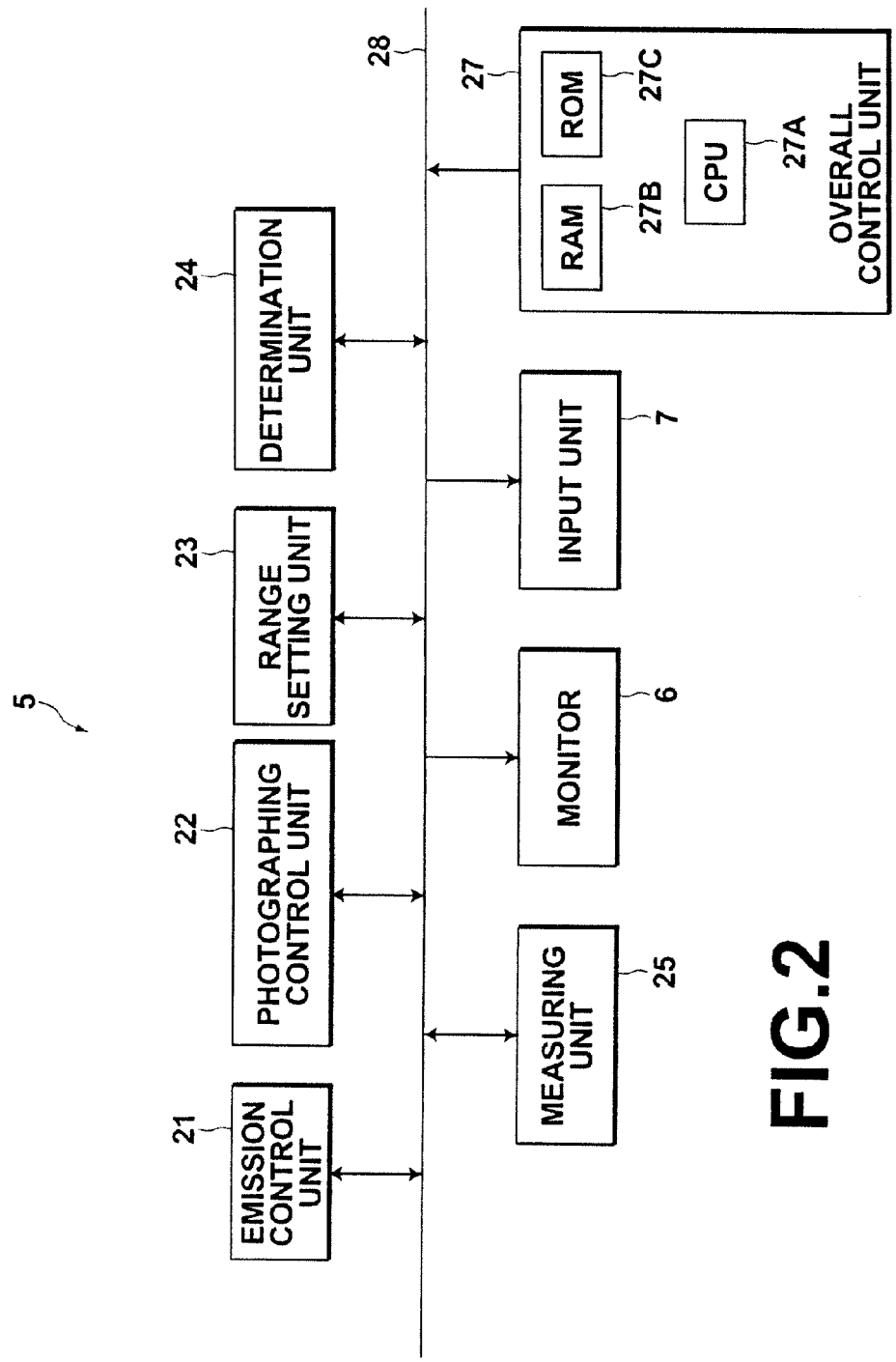
FIG. 2 is a schematic block diagram of the calculation unit of the first embodiment, illustrating the configuration thereof.

FIG. 2 is a schematic block diagram of calculation unit 5, illustrating the configuration thereof. As illustrated in FIG. 2, calculation unit 5 includes emission control unit 21 that drive controls projector 4, photographing control unit 22 that controls the operations of first and second cameras 2, 3, range setting unit 23 that sets a light illumination range of the subject, determination unit 24 that determines whether to emit the pattern light to the subject, measuring unit 25 that measures a three-dimensional shape of the subject using base image G1 and reference image G2 obtained by photographing the subject illuminated by the pattern light, and overall control unit 27 that controls the overall operation of calculation unit 5, in which emission control unit 21, photographing control unit 22, range setting unit 23, determination unit 24, measuring unit 25, and overall control unit 27, together with monitor 6 and input unit 7, are interconnected by bus 28.

Overall control unit 27 includes CPU 27A, RAM 27B used as the work area, and ROM 27C having therein various types of information, including a manipulation/control program.

Emission control unit 21 ON/OFF controls light source 11 based on an instruction from overall control unit 27. Further, unit 21 performs pattern display control on conversion unit 12 according to determination results of determination unit 24.

Photographing control unit 22 instructs first and second cameras 2, 3 to obtain base image G1 and reference image G2 by photographing a subject when an instruction to perform a three-dimensional shape measurement is inputted from input unit 7. Further, prior to obtaining base image G1 and reference image G2, photographing control unit 22 issues an instruction to obtain a pre-image to first camera 2.

Figure 3:
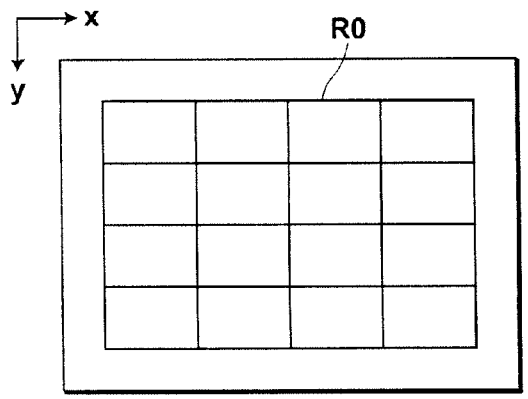
FIG. 3 illustrates setting of light illumination area.

Range setting unit 23 sets a range on the pre-image where light outputted from projector 4 is emitted. FIG. 3 illustrates setting of a light illumination area. As illustrated in FIG. 3, range setting unit 23 sets illumination range R0 of 4×4=16 segments on the pre-image. Here, the position of each segment within illumination range R0 is identified by a coordinate value of an x, y coordinate system set in the manner illustrated in FIG. 3.

Figure 4A:
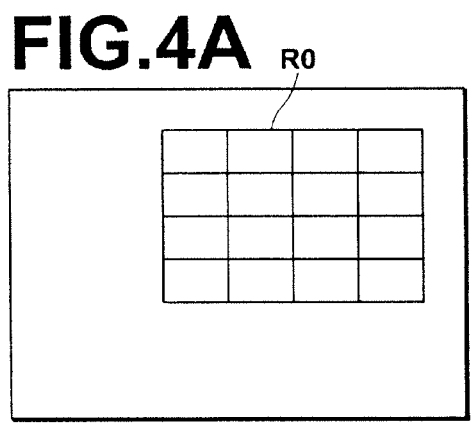
FIGS. 4A to 4C illustrate another example of light illumination area setting.
Figure 4B:
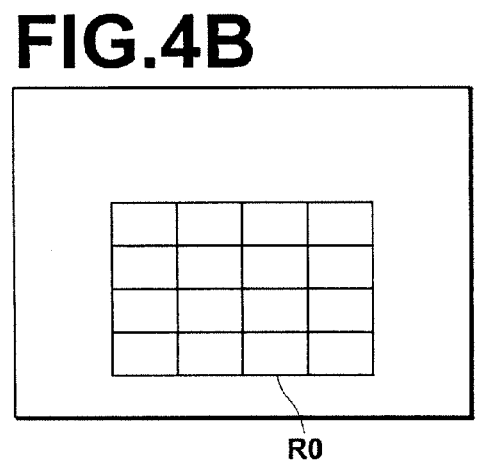
Figure 4C:
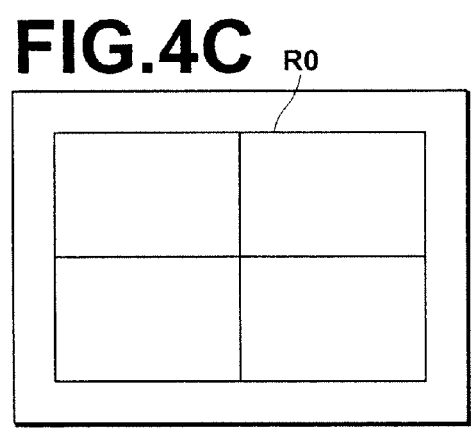

It should be appreciated that the position within illumination range R0 and the number of divisions are not limited to this. For example, illumination range R0 may be reduced, as illustrated in FIGS. 4A, 4B, or the number of divisions may be reduced to 2×2, as illustrated in FIG. 4C. Illumination range R0 may be a range preset based on an instruction from the user through input unit 7, in which a pre-image is displayed on monitor 6 and the range is set by the user by viewing the displayed pre-image.

Determination unit 24 calculates an evaluation value for determining, for each segment within illumination range R0 set on the pre-image, whether to emit pattern light. More specifically, determination unit 24 detects an edge included in an image of a segment by a calculation using a differential filter, and uses the number of detected edges as the evaluation value. Here, an arrangement may be adopted in which contrast of an image of a segment is detected and the detected contrast is used as the evaluation value.

Here, the image of a segment having a small number of edges is given a small evaluation value. Also, the image of a segment having a low contrast is given a small evaluation value. If the image of a segment has a small evaluation value, corresponding points for measuring a three-dimensional shape, to be described later, can not be obtained accurately. Consequently, determination unit 24 compares the evaluation value to threshold value Th1, and determines that the pattern light is to be emitted to the segment if the evaluation value is not greater than threshold value Th1.

Figure 5:
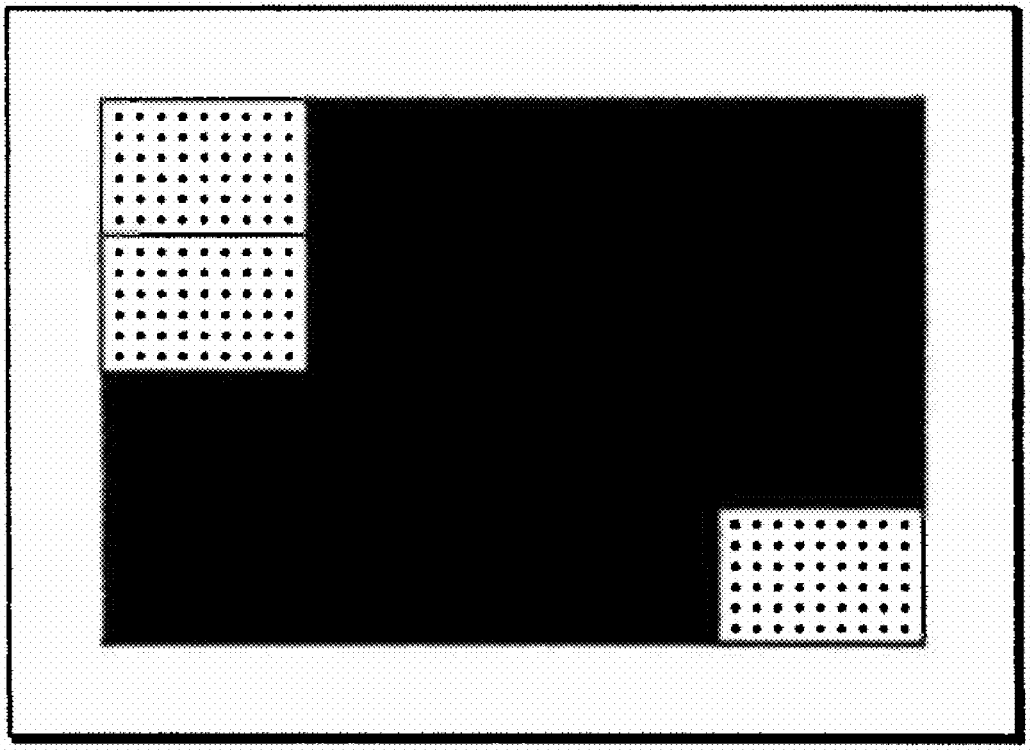
FIG. 5 illustrates a pattern displayed in the conversion unit in the first embodiment.

Emission control unit 21 displays a pattern of a type according to the determination results of determination unit 24 in the conversion unit 12. For example, where illumination range R0 like that shown in FIG. 3 is set and pattern light is determined to be emitted on segments (1, 1), (1, 2), and (4, 4) by determination unit 24, a pattern like that shown in FIG. 5 is displayed in conversion unit 12. When light source 11 is activated, this causes pattern light to be emitted on the portions of a subject corresponding to the segments (1, 1), (1, 2), and (4, 4) on images to be obtained by first and second cameras 2, 3, and no other portions of the subject receive light at all.

Measuring unit 25 measures a three-dimensional shape of the subject based on base image G1 and reference image G2 obtained by first and second cameras 2, 3 by photographing the subject illuminated by the pattern light. That is, measuring unit sets matching windows in base image G1 and reference image G2 and obtains corresponding points by matching pixels of base image G1 and reference image G2 using epipolar line information. Here, ROM 27C has therein an internal parameter representing the positional relationship between each of optical paths of the lenses of first and second cameras 2, 3 and each of imaging planes, and an external parameter representing the positional relationship between first and second cameras 2, 3, and measuring unit 25 obtains corresponding points by performing pixel matching with reference to the internal and external parameters. The internal and external parameters have been obtained in advance by camera calibration and stored in ROM 27C. When the pixel matching is completed, measuring unit 25 calculates a three-dimensional shape of the subject based on the corresponding points and outputs calculation results to monitor 6 as a distance image.

Figure 6:
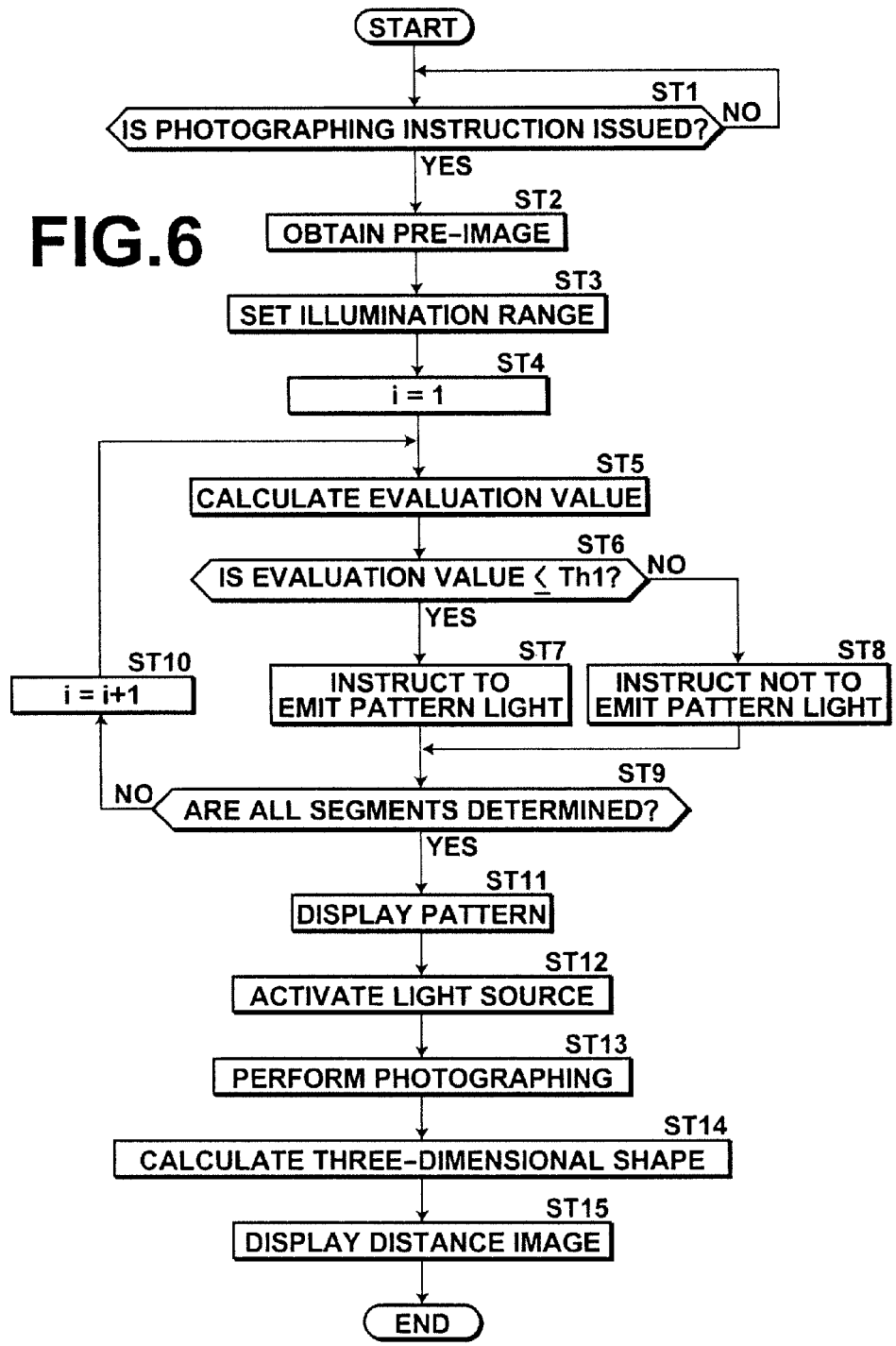
FIG. 6 is a flowchart illustrating a process performed in the first embodiment.

Next, a process performed in the first embodiment will be described. FIG. 6 is a flowchart of the process performed in the first embodiment. Overall control unit 27 keeps monitoring whether or not an instruction to perform photographing for a three-dimensional shape measurement is issued (step ST1). If step ST1 is positive, first camera 2 obtains a pre-image (step ST2) and range setting unit 23 sets illumination range R0 on the pre-image (step ST3).

Then, overall control unit 27 sets the determination target segment within illumination range R0 to a first segment (i=1, step ST4). Determination unit 24 calculates an evaluation value of the target segment (step ST5) and determines whether or not the evaluation value is not greater than threshold value Th1 (step ST6). If step ST6 is positive, determination unit 24 instructs emission control unit 21 to emit pattern light on the segment (step ST7). If step ST6 is negative, determination unit 24 instructs emission control unit 21 not to emit pattern light on the segment (step ST8).

Thereafter, overall control unit 27 determines whether or not the determination is made for all of the segments (step ST9). If step ST9 is negative, the determination target segment is set to a next segment (i=i+1, step ST10), and the process returns to step ST5. If step ST9 is positive, emission control unit 21 displays a pattern in conversion unit 12 (step ST11) and activates light source 11 (step ST12). This causes pattern light according to determination results to be emitted on the subject.

Then, photographing control unit 22 causes first and second cameras 2, 3 to perform photographing (step ST13). Measuring unit 25 obtains corresponding points through matching between pixels of base image G1 and reference image G2, calculates a three-dimensional shape of the subject based on the corresponding points (step ST14), and displays calculation results, i.e., a distance image on monitor 6 (step ST15), and the process is completed.

As described above, in the first embodiment, illumination range R0 of a plurality of segments is set on a pre-image, then with respect to each segment within illumination range R0, a determination is made as to whether or not pattern light is emitted, and the pattern light is emitted only to a segment determined to receive the pattern light. This may prevent the pattern light from being emitted to a portion having a high contrast or a local characteristic included in the angle of view of first camera 2 or second camera 3, such as having many edges or the like. Consequently, even when a portion having a high contrast or a local characteristic is included in the angle of view, high quality base image G1 and reference image G2 without a moiré and the like may be obtained and corresponding points may be obtained accurately, whereby a three-dimensional shape of the subject may be measured accurately.

Figure 7:
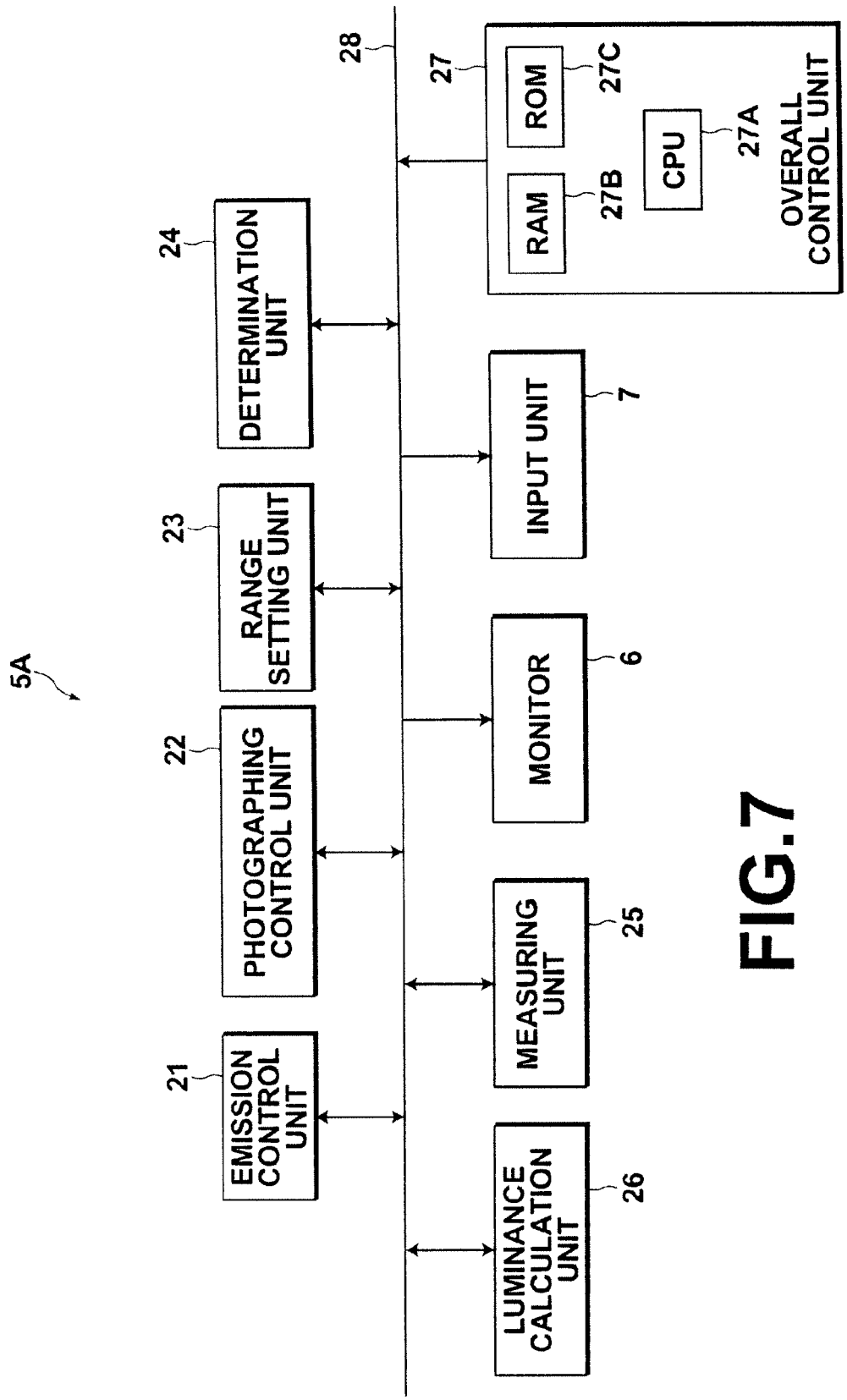
FIG. 7 is a schematic block diagram of the calculation unit of the second embodiment, illustrating the configuration thereof.

Next, a second embodiment of the present invention will be described. The second embodiment differs from the first embodiment only in the configuration of calculation unit 5. Therefore, only the configuration of calculation unit 5 will be described here. FIG. 7 illustrates a configuration of the calculation unit of a three-dimensional shape measuring system according to the second embodiment. As illustrated in FIG. 7, calculation unit 5A of the three-dimensional shape measuring system according to the second embodiment differs from calculation unit 5 of the first embodiment in that it further includes luminance calculation unit 26 that calculates a luminance of the pre-image with respect to each segment of the illumination area, and the amount of light emitted on the subject is changed for each segment according to the luminance.

Figure 8:
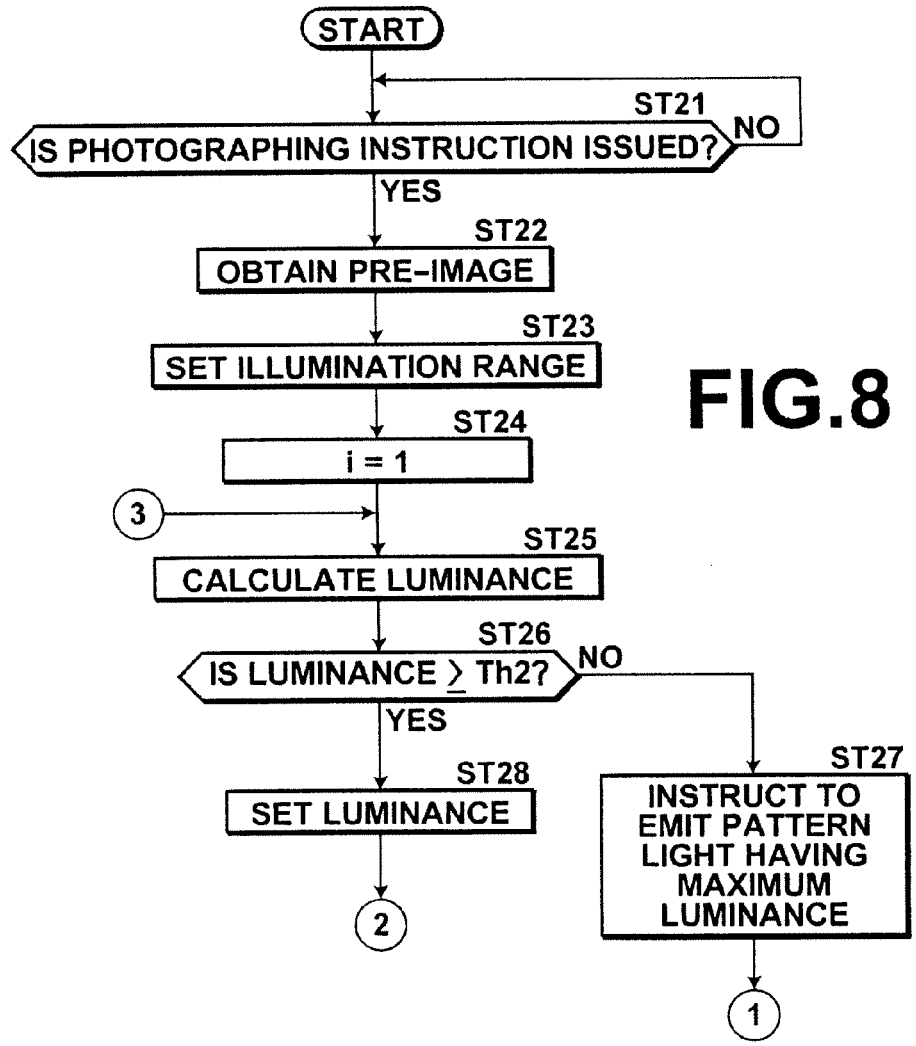
FIG. 8 is a flowchart illustrating a process performed in the second embodiment (part 1).
Figure 9:
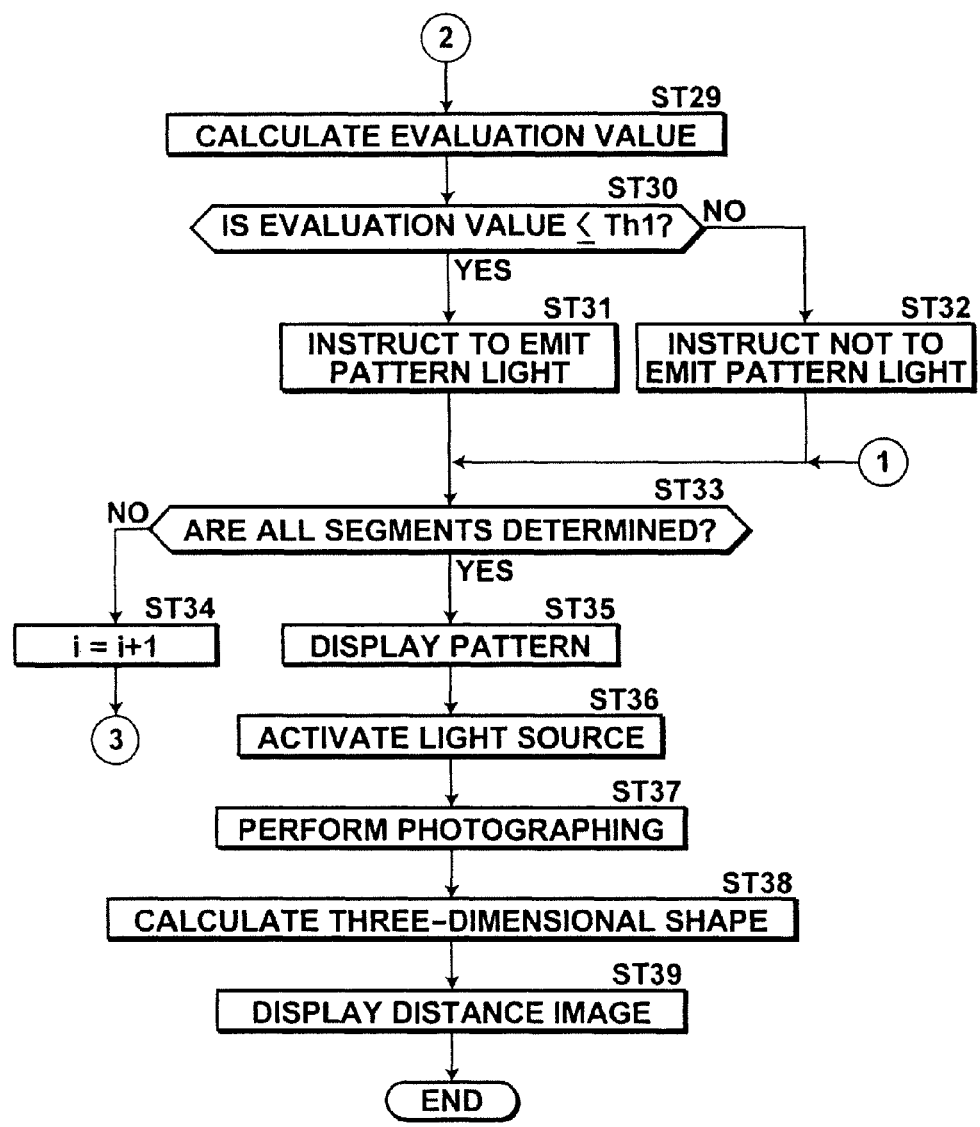
FIG. 9 is a flowchart illustrating a process performed in the second embodiment (part 2).

Next, a process performed in the second embodiment will be described. FIGS. 8 and 9 show a flowchart of the process performed in the second embodiment. Overall control unit 27 keeps monitoring whether or not an instruction perform photographing for a three-dimensional shape measurement is issued (step ST21). If step ST21 is positive, first camera 2 obtains a pre-image (step ST22) and range setting unit 23 sets illumination range R0 on the pre-image (step ST23).

Then, overall control unit 27 sets the determination target segment within illumination range R0 to a first segment (i=1, step ST24). Luminance calculation unit 26 calculates a luminance of the target segment (step ST25). For example, an average value of all pixel values of the pre-image may be used as the luminance. Then, determination unit 24 determines whether or not the luminance is not less than predetermined threshold value Th2 (step ST26). If step ST26 is negative, determination unit 24 instructs emission control unit 21 to emit pattern light having a preset maximum luminance (step ST27), and the process proceeds to step ST33.

If step ST26 is positive, determination unit 24 sets the luminance of the light to be emitted on the target segment (step ST28). More specifically, the transmission factor of a portion of conversion unit 12 corresponding to the target segment is set such that light with an amount corresponding to a preset luminance of the target segment is emitted on the area of the subject corresponding to the target segment.

Then, determination unit 24 calculates an evaluation value of the target segment (step ST29) and determines whether or not the evaluation value is not greater than threshold value Th1 (step ST30). If step ST30 is positive, determination unit 24 instructs emission control unit 21 to emit pattern light to the segment (step ST31). If step ST30 is negative, determination unit 24 instructs emission control unit 21 not to emit pattern light on the segment (step ST32).

Thereafter, overall control unit 27 determines whether or not the determination is made for all of the segments (step ST33). If step ST33 is negative, the determination target segment is set to a next segment (i=i+1, step ST34), and the process returns to step ST25. If step ST33 is positive, emission control unit 21 displays a pattern in conversion unit 12 (step ST35) and activates light source 11 (step ST36). This causes pattern light according to determination results to be emitted on the subject.

Figure 10:
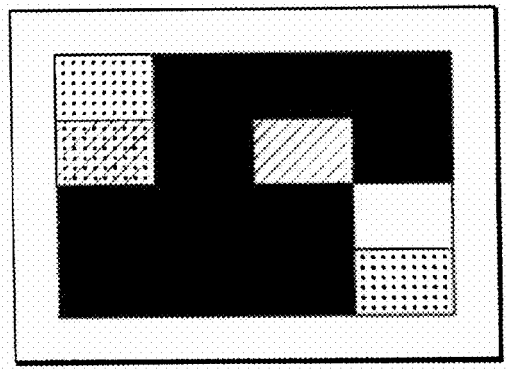
FIG. 10 illustrates a pattern displayed in the conversion unit in the second embodiment.

FIG. 10 illustrates a pattern displayed in conversion unit 12 in the second embodiment. Where illumination range R0 like that shown in FIG. 3 is set and if determination unit 24 determines that pattern light having a maximum luminance is emitted on the segments (1, 1) and (4, 4), pattern light having a lower luminance than the maximum luminance is emitted on segment (1, 2), light (not the pattern light) of maximum luminance is emitted on segment (4, 3), and light (not the pattern light) having a lower luminance than the maximum luminance is emitted on segment (3, 2), a pattern like that shown in FIG. 10 is displayed in conversion unit 12. When light source 11 is activated, this causes pattern light having a maximum luminance to be emitted on the portions of a subject corresponding to the segments (1, 1), (4, 4) on images to be obtained by first and second cameras 2, 3, pattern light having a luminance lower than the maximum luminance is emitted on a portion of the subject corresponding to segment (1, 2), light having a maximum luminance is emitted on a portion of the subject corresponding to the segment (4, 3), light having a lower luminance than the maximum luminance is emitted on a portion of the subject corresponding to the segment (3, 2), and no other portions of the subject receive light at all.

Then, photographing control unit 22 causes first and second cameras 2, 3 to perform photographing (step ST37). Measuring unit 25 obtains corresponding points through matching between pixels of base image G1 and reference image G2, calculates a three-dimensional shape of the subject based on the corresponding points (step ST38), and displays calculation results, i.e., a distance image on monitor 6 (step ST39), and the process is completed.

As described above, in the second embodiment, a luminance of a pre-image is calculated with respect to each segment within illumination range R0, the amount of light emitted on the subject is changed for each segment according to the luminance. This may cause a segment having a low luminance to become bright.

Further, pattern light having a maximum luminance is emitted on a segment of those within illumination range R0 having a luminance lower than threshold value Th2, so that high luminance pattern light may be emitted on a dark portion of the subject without requiring a complicated process.

Figure 11:
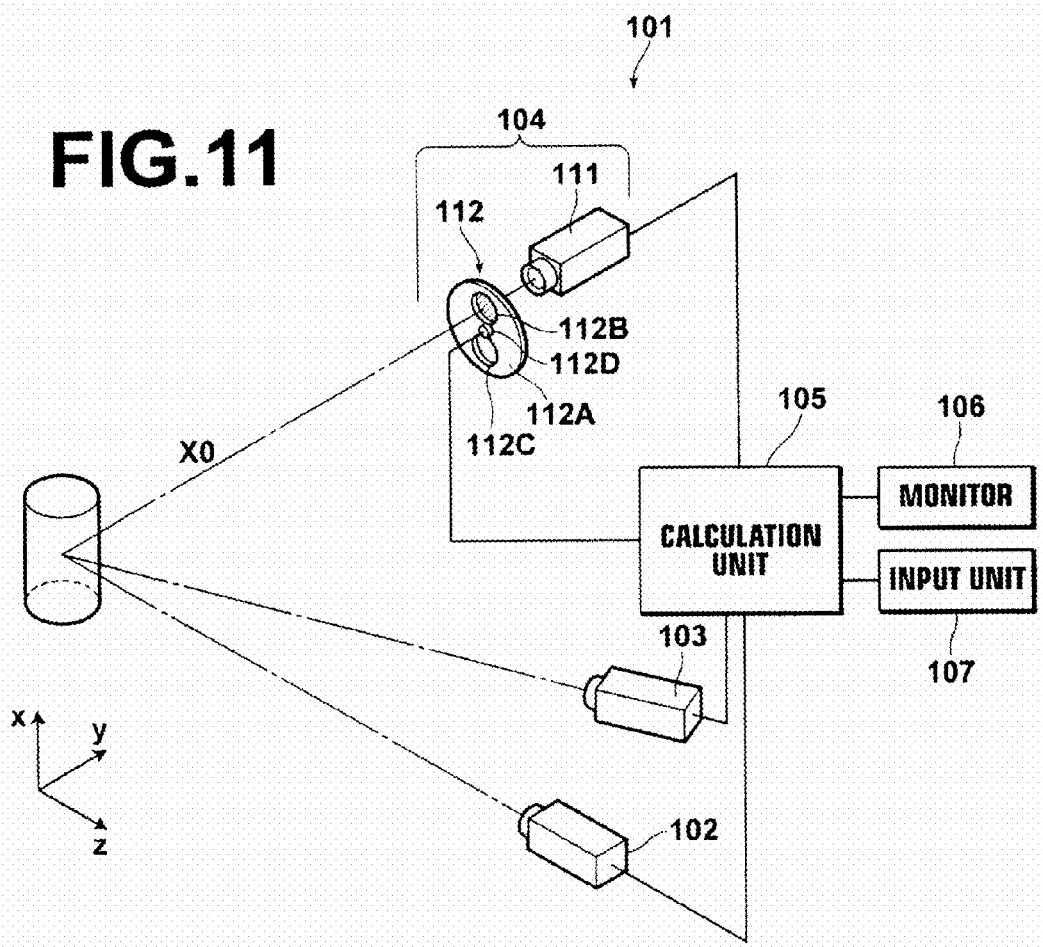
FIG. 11 is an external perspective view of a three-dimensional shape measuring system according to a third embodiment of the present invention.

Next, a third embodiment of the present invention will be described. FIG. 11 is an external perspective view of a three-dimensional shape measuring system incorporating a three-dimensional shape measurement photographing apparatus according to the third embodiment of the present invention. As illustrated in FIG. 11, three-dimensional shape measuring system 101 of the present embodiment includes first camera 102, second camera 103, projector 104, calculation unit 105, monitor 106, and input unit 107.

First and second cameras 102, 103 are placed at a predetermined distance from each other with a predetermined convergence angle, and respectively photograph a subject from different positions in response to an instruction from calculation unit 105 to obtain images used for measuring a three-dimensional shape of the subject. The obtained images are inputted to calculation unit 105 and used for measuring a three-dimensional shape of the subject. Note that first and second cameras 102, 103 correspond to photographing units.

Projector 104 is a device for emitting pattern light having a predetermined pattern, such as a grid pattern or the like, on the subject based on an instruction from calculation unit 105. Projector 104 includes light source 111 for emitting light, such as LED or the like and filter unit 112 for converting light emitted from light source 111 to pattern light. Note that projector 104 and emission control unit 121, to be described later, correspond to an emission unit.

Filter unit 112 includes a disk 112A on which pattern filter 112B having patterns, on the opposite sides of the center, printed such that light transmitting through the filer has a predetermined pattern and transparent filter 112C are attached. In the present embodiment, a grid pattern is used as the pattern. Disk 112A is rotatable by motor 112D around a rotational axis passing through the center thereof and parallel to optical path X0 of light emitted from light source 111. This allows pattern filter 112B and transparent filter 112C to be interchangeably disposed on optical path X0 based on an instruction from calculation unit 105.

Here, provision of transparent filter 112C in filter unit 112 allows light to be emitted to a subject from projector 104 when the amount of light is insufficient for the subject.

Calculation unit 105 performs calculations required for measuring a three-dimensional shape of the subject and drive controls first camera 102, second camera 103, and projector 104.

Figure 12:
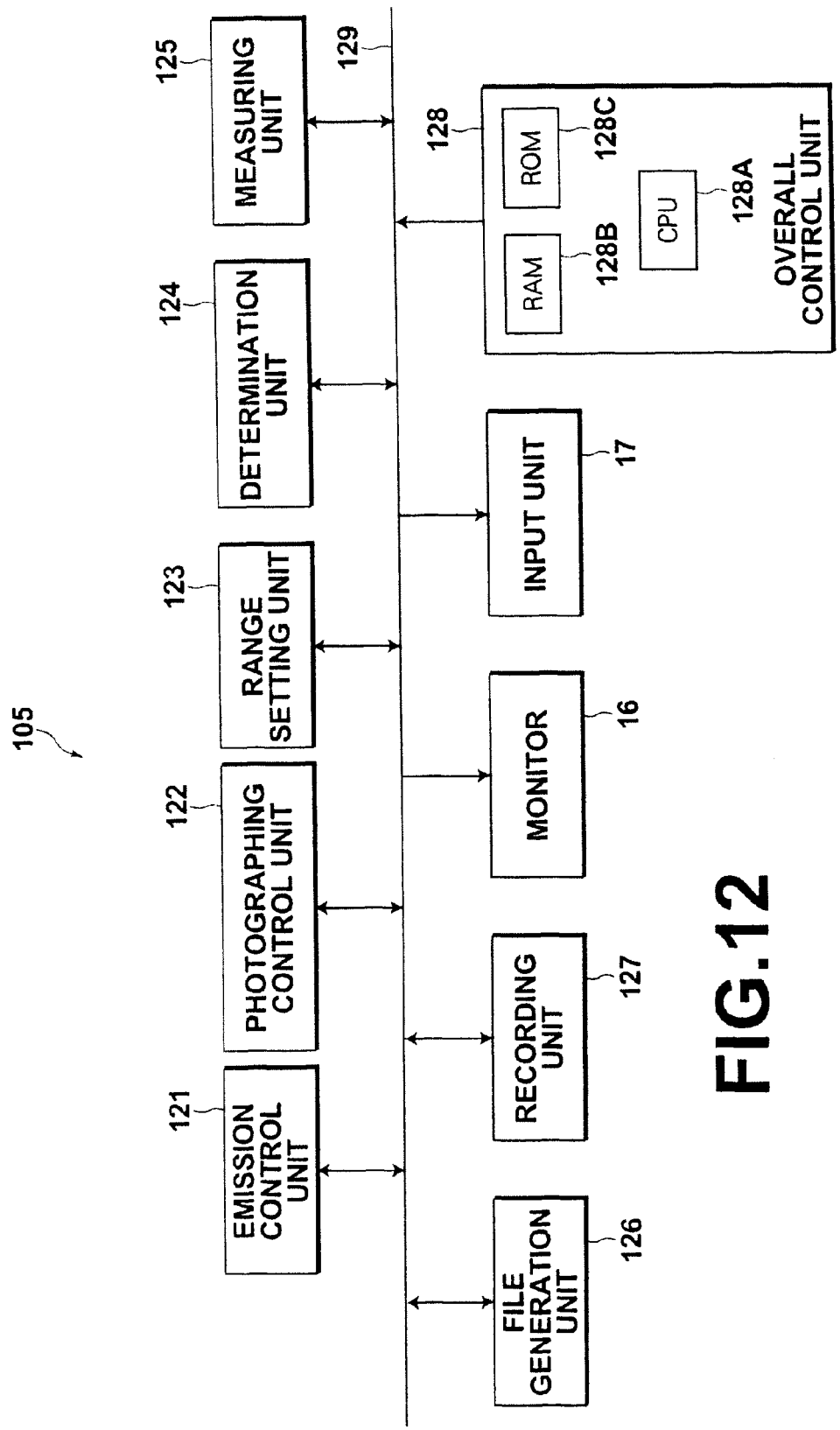
FIG. 12 is a schematic block diagram of the calculation unit of the third embodiment, illustrating the configuration thereof.

FIG. 12 is a schematic block diagram of calculation unit 105, illustrating the configuration thereof. As illustrated in FIG. 12, calculation unit 105 includes emission control unit 121 that drive controls projector 104, photographing control unit 122 that controls the operations of first and second cameras 102, 103, range setting unit 123 that sets a light illumination area of the subject, determination unit 124 that determines whether to emit the pattern light to the subject, measuring unit 125 that measures a three-dimensional shape of the subject using images obtained by first and second cameras 102, 103, file generation unit 126 that generates image files of the images obtained by first and second cameras 102, 103, recording unit 127 that records image files on a not shown medium, and overall control unit 128 that controls the overall operation of calculation unit 105, in which emission control unit 121, photographing control unit 122, range setting unit 123, determination unit 124, measuring unit 125, file generation unit 126, recording unit 127, and overall control unit 128, together with monitor 106 and input unit 107, are interconnected by bus 129.

Overall control unit 128 includes CPU 128A, RAM 128B used as the work area, and ROM 128C having therein various types of information, including a manipulation/control program.

Emission control unit 121 ON/OFF controls light source 111 based on an instruction from overall control unit 128. Further, in response to an instruction from overall control unit 128, emission control unit 121 issues an instruction to rotate motor 112D in order to place either one of pattern filter 112B and transparent filter 112C of filter unit 112 on optical path X0.

Photographing control unit 122 instructs first and second cameras 102, 103 to obtain images by photographing a subject when an instruction to perform a three-dimensional shape measurement is inputted from input unit 107. Further, prior to obtaining images for the three-dimensional shape measurement, photographing control unit 122 issues an instruction to obtain a pre-image to first camera 102.

Range setting unit 123 sets a range on the pre-image where light outputted from projector 104 is emitted as in range setting unit 23 in the first embodiment.

Determination unit 124 calculates an evaluation value for determining, for each segment within illumination range R0 set on the pre-image, whether to emit pattern light. More specifically, determination unit 124 detects an edge included in an image of a segment by a calculation using a differential filter, and uses the number of detected edges as the evaluation value. Here, an arrangement may be adopted in which contrast of an image of a segment is detected and the detected contrast is used as the evaluation value.

Here, the image of a segment having a small number of edges is given a small evaluation value. Also, the image of a segment having a low contrast is given a small evaluation value. If the image of a segment has a small evaluation value, corresponding points for measuring a three-dimensional shape, to be described later, can not be obtained accurately. Consequently, determination unit 124 compares the evaluation value to threshold value Th1, and determines that the pattern light is to be emitted to the segment if the evaluation value is not greater than threshold value Th1.

Figure 13:
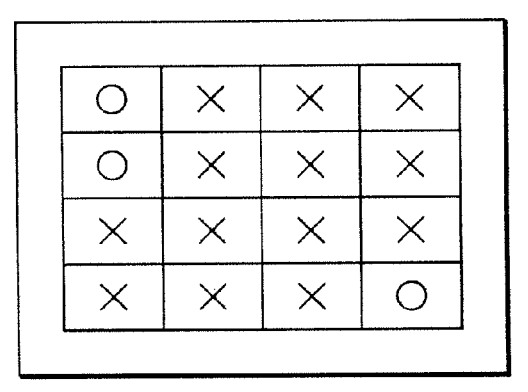

For example, where illumination range R0 like that shown in FIG. 3 is set and pattern light is determined to be emitted on segments (1, 1), (1, 2), and (4, 4) by determination unit 124, segments (1, 1), (1, 2), and (4, 4) are illumination areas and other segments are non-illumination areas, as shown in FIG. 13. In FIG. 13, illumination areas are indicated by o and non-illumination areas are indicated by x.

Measuring unit 125 measures a three-dimensional shape of a subject based on non-illumination base image G11 and non-illumination reference image G12 obtained by first and second cameras 102, 103 by photographing the subject not illuminated by the pattern light, and illumination base image G11' and illumination reference image G12' obtained by first and second cameras 102, 103 by photographing the subject illuminated by the pattern light. Note that non-illumination base image G11 and non-illumination reference image G12 correspond to first measuring images, and illumination base image G11' and illumination reference image G12' correspond to second measuring images.

When measuring the three-dimensional shape, corresponding points are obtained. If pixels for obtaining corresponding points are present in a non-illumination area, matching windows are set in non-illumination base image G11 and non-illumination reference image G12 and corresponding points are obtained by matching pixels of non-illumination base image G11 and non-illumination reference image G12 using epipolar line information. On the other hand, if pixels for obtaining corresponding points are present in an illumination area, matching windows are set in illumination base image G11' and illumination reference image G12' and corresponding points are obtained by matching pixels of illumination base image G11' and illumination reference image G12' using epipolar line information.

Here, ROM 128C has therein an internal parameter representing the positional relationship between each of optical paths of the lenses of first and second cameras 102, 103 and each of imaging planes, and an external parameter representing the positional relationship between first and second cameras 102, 103, and measuring unit 125 obtains corresponding points by performing pixel matching with reference to the internal and external parameters. The internal and external parameters have been obtained in advance by camera calibration and stored in ROM 128C. When the pixel matching is completed, measuring unit 125 calculates a three-dimensional shape of the subject based on the corresponding points and outputs calculation results to monitor 106 as a distance image.

File generation unit 126 performs compression, for example, in JPEG compression format or the like on image data representing non-illumination base image G11, non-illumination reference image G12, illumination base image G11', and illumination reference image G12' to generate an image file. Thus, the image file includes the image data representing non-illumination base image G11, non-illumination reference image G12, illumination base image G11', and illumination reference image G12'. A tag that includes auxiliary information, such as photographing date and time and the like, based on Exif format or the like is attached to the file. In the present embodiment, information identifying positions of a non-illumination area and an illumination area within illumination range R0 is described in the tag.

Recording unit 127 records the image file generated by file generation unit 126 on a medium.

Figure 14:
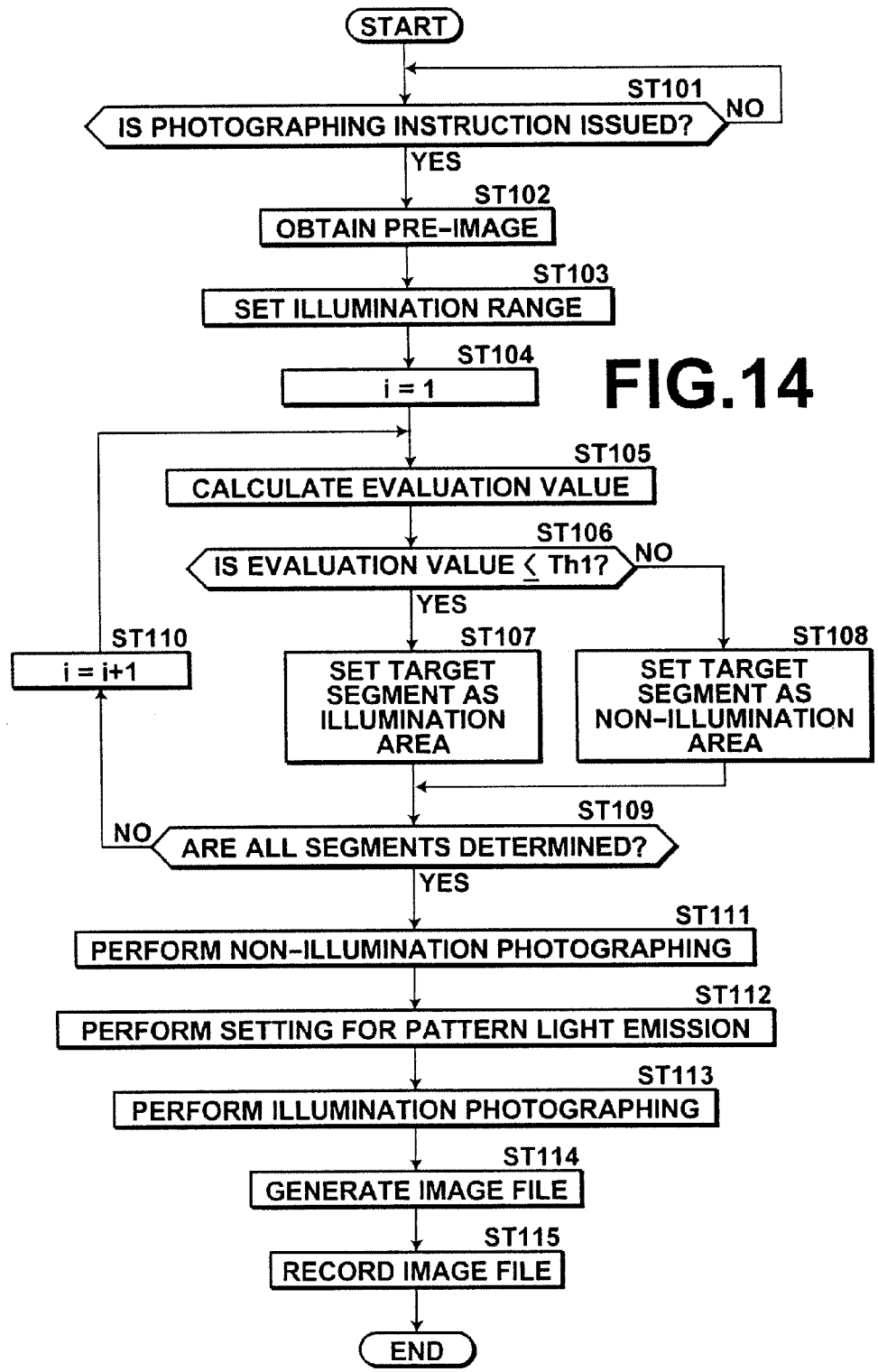
FIG. 14 is a flowchart illustrating a process performed in the third embodiment.

Next, a process performed in the third embodiment will be described. FIG. 14 is a flowchart of the process performed in the third embodiment. Overall control unit 128 keeps monitoring whether or not an instruction to perform photographing for a three-dimensional shape measurement is issued (step ST101). If step ST101 is positive, first camera 102 obtains a pre-image (step ST102) and range setting unit 123 sets illumination range R0 on the pre-image (step ST103).

Then, overall control unit 128 sets the determination target segment within illumination range R0 to a first segment (i=1, step ST104). Determination unit 124 calculates an evaluation value of the target segment (step ST105) and determines whether or not the evaluation value is not greater than threshold value Th1 (step ST106). If step ST106 is positive, determination unit 124 sets the target segment as an illumination area (step ST107), while if step ST106 is negative, determination unit 124 sets the target segment as a non-illumination area (step ST108).

Thereafter, overall control unit 128 determines whether or not the determination is made for all of the segments (step ST109). If step ST109 is negative, the determination target segment is set to a next segment (i=i+1, step ST110), and the process returns to step ST105.

If step ST109 is positive, photographing control unit 122 causes first and second cameras 102, 103 to perform photographing (non-illumination photographing, step ST111), whereby non-illumination base image G11 and non-illumination reference image G12 are obtained.

Then, emission control unit 121 performs setting of projector 104 for emission of pattern light (step ST112). That is, emission control unit 121 activates light source 111 and gives an instruction to motor 112D to rotate filter unit 112 so that pattern filter 112B is placed on optical path X0 of light emitted from light source 111. This causes the light emitted from light source 111 to be converted to pattern light by pattern filter 112B and emitted to the subject. Pattern light reflected from the subject enters into first and second cameras 102, 103.

Then photographing control unit 122 causes first and second cameras 102, 103 to perform photographing (illumination photographing, step ST113), whereby illumination base image G11' and illumination reference image G12' are obtained. Then, file generation unit 126 generates an image file from image data representing non-illumination base image G11, non-illumination reference image G12, illumination base image G11', and illumination reference image G12' (step ST114). Note that information identifying positions of a non-illumination area and illumination area within illumination range R0 is described in the tag of the image file. Then, recording unit 127 records the image file on a medium (step ST115), and the process is completed.

As described above, in the third embodiment, illumination range R0 of a plurality of segments is set on a pre-image and with respect to each segment within illumination range R0, a determination is made as to whether or not pattern light is emitted. Then, in addition to non-illumination base image G11 and non-illumination reference image G12, illumination base image G11' and illumination reference image G12' are obtained by photographing a subject while emitting pattern light to the subject. Then, in measuring unit 125, corresponding points are searched for using non-illumination base image G11 and non-illumination reference image G12 for a portion having a high contrast or a local characteristic included in the angle of view, and using illumination base image G11' and illumination reference image G12' for the other portions based on determination results. Consequently, corresponding points may be obtained accurately using high quality images without a moiré and the like, whereby a three-dimensional shape of the subject may be measured accurately.

Next, a fourth embodiment of the present invention will be described. The configuration of the three-dimensional shape measuring system according to the fourth embodiment is identical to that of the three-dimensional shape measuring system according to the third embodiment. Therefore, the configuration will not be elaborated upon further here. The fourth embodiment differs from the third embodiment in that it performs non-illumination and illumination photographing first without obtaining a pre-image, and determination unit 124 makes the determination using either one of non-illumination base image G11 and non-illumination reference image G12. In the fourth embodiment, it is assumed that the determination is made using non-illumination base image G11.

Figure 15:
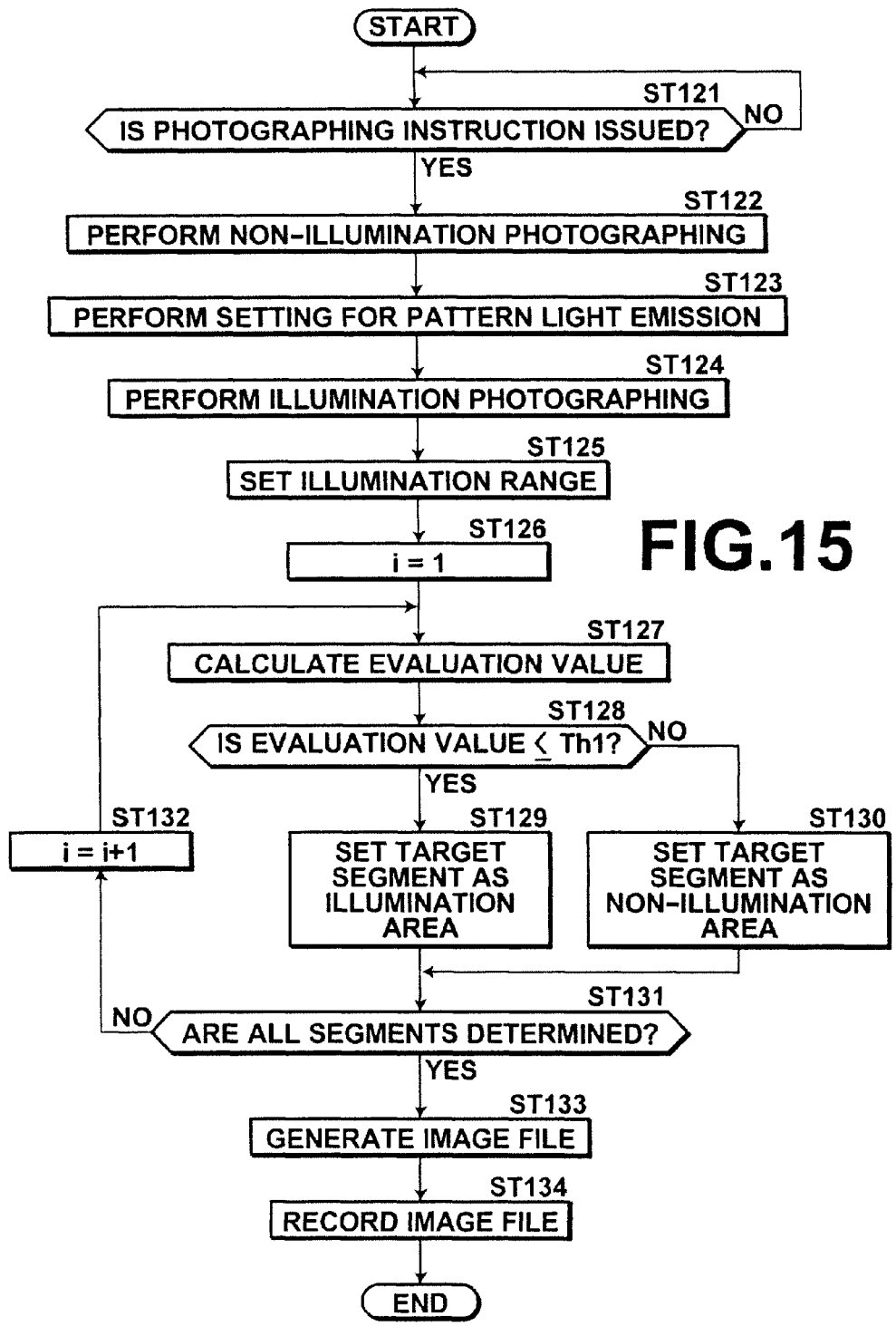
FIG. 15 is a flowchart illustrating a process performed in a fourth embodiment.

Next, a process performed in the fourth embodiment will be described. FIG. 15 is a flowchart of the process performed in the fourth embodiment. Overall control unit 128 keeps monitoring whether or not an instruction to perform photographing for a three-dimensional shape measurement is issued (step ST121). If step ST121 is positive, photographing control unit 122 causes first and second cameras 102, 103 to perform photographing (non-illumination photographing, step ST122), whereby non-illumination base image G11 and non-illumination reference image G12 are obtained.

Then, emission control unit 121 performs setting of projector 104 for emission of pattern light (step ST123), and photographing control unit 122 causes first and second cameras 102, 103 to perform photographing (illumination photographing, step ST124), whereby illumination base image G11' and illumination reference image G12' are obtained.

Then, range setting unit 123 sets illumination range R0 on non-illumination base image G11 (step ST125). Then, overall control unit 128 sets the determination target segment within illumination range R0 to a first segment (i=1, step ST126). Determination unit 124 calculates an evaluation value of the target segment (step ST127) and determines whether or not the evaluation value is not greater than threshold value Th1 (step ST128). If step ST128 is positive, determination unit 124 sets the segment as an illumination area (step ST129). If step ST128 is negative, determination unit 124 sets the segment as a non-illumination area (step ST130).

Thereafter, overall control unit 128 determines whether or not the determination is made for all of the segments (step ST131). If step ST131 is negative, the determination target segment is set to a next segment (i=i+1, step ST132), and the process returns to step ST127.

If step ST131 is positive, file generation unit 126 generates an image file from image data representing non-illumination base image G11, non-illumination reference image G12, illumination base image G11', and illumination reference image G12' (step ST133). Note that information identifying positions of a non-illumination area and illumination area within illumination range R0 is described in the tag of the image file. Then, recording unit 127 records the image file on a medium (step ST134), and the process is completed.

In the fourth embodiment, the determination is made using non-illumination base image G11, but the determination may be made using non-illumination reference image G12.

Next, a fifth embodiment of the present invention will be described. The configuration of the three-dimensional shape measuring system according to the fifth embodiment is identical to that of the three-dimensional shape measuring system according to the third embodiment. Therefore, the configuration will not be elaborated upon further here. The fifth embodiment differs from the third embodiment in that it performs non-illumination photographing first without obtaining a pre-image to obtain non-illumination base image G11 and non-illumination reference image G12, makes the determination using either one of non-illumination base image G11 and non-illumination reference image G12, and performs illumination photographing only when required. In the fifth embodiment, it is assumed that the determination is made using non-illumination base image G11.

Figure 16:
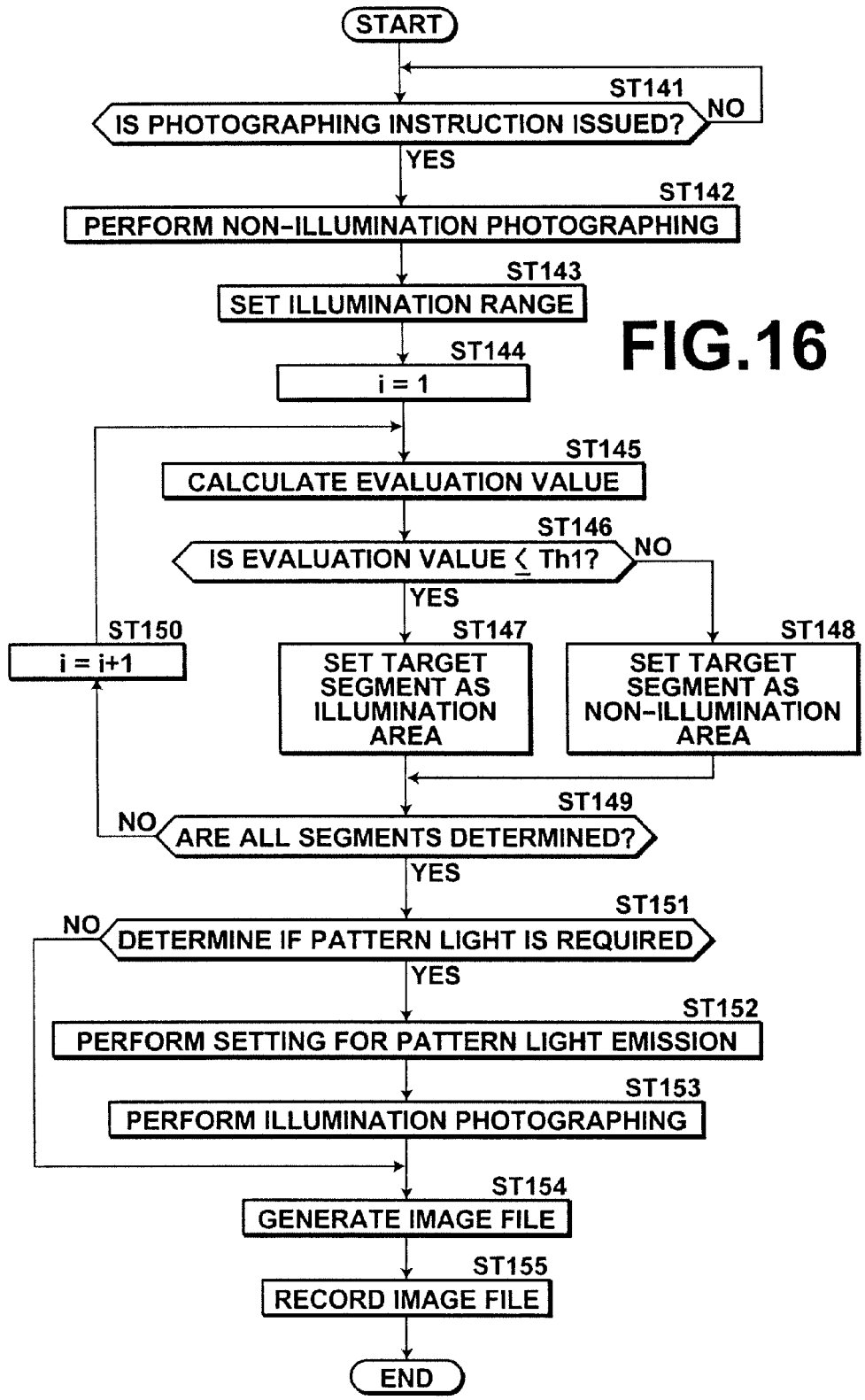
FIG. 16 is a flowchart illustrating a process performed in a fifth embodiment.

Next, a process performed in the fifth embodiment will be described. FIG. 16 is a flowchart of the process performed in the fifth embodiment. Overall control unit 128 keeps monitoring whether or not an instruction to perform photographing for a three-dimensional shape measurement is issued (step ST141). If step ST141 is positive, photographing control unit 122 causes first and second cameras 102, 103 to perform photographing (non-illumination photographing, step ST142), whereby non-illumination base image G11 and non-illumination reference image G12 are obtained.

Then, range setting unit 123 sets illumination range R0 on non-illumination base image G11 (step ST143). Then, overall control unit 128 sets the determination target segment within illumination range R0 to a first segment (i=1, step ST144). Determination unit 124 calculates an evaluation value of the target segment (step ST145) and determines whether or not the evaluation value is not greater than threshold value Th1 (step ST146). If step ST146 is positive, determination unit 124 sets the segment as an illumination area (step ST147). If step ST146 is negative, determination unit 124 sets the segment as a non-illumination area (step ST148).

Thereafter, overall control unit 128 determines whether or not the determination is made for all of the segments (step ST149). If step ST149 is negative, the determination target segment is set to a next segment (i=i+1, step ST150), and the process returns to step ST145.

If step ST149 is positive, a determination is made as to whether or not pattern light is required to be emitted (step ST151). Here, if all of the segments are set as non-illumination areas, pattern light is not required to be emitted and step ST151 is negative. But, if there is even one segment set to an illumination area, step ST151 is positive. If step ST151 is positive, emission control unit 121 performs setting of projector 104 for emission of pattern light (step ST152), and photographing control unit 122 causes first and second cameras 102, 103 to perform photographing (illumination photographing, step ST153), whereby illumination base image G11' and illumination reference image G12' are obtained. Then, file generation unit generates an image file from image data representing non-illumination base image G11, non-illumination reference image G12, illumination base image G11', and illumination reference image G12' (step ST154). Note that information identifying positions of a non-illumination area and illumination area within illumination range R0 is described in the tag of the image file. Then, recording unit 127 records the image file on a medium (step ST155), and the process is completed.

In the mean time, if step ST151 is negative, the process proceeds to step ST154. In this case, file generation unit 126 generates an image file from image data representing non-illumination base image G11 and non-illumination reference image G12, and information identifying only positions of non-illumination areas within illumination range R0 is described in the tag of the image file.

In the fifth embodiment described above, illumination photographing is performed. Here, an arrangement may also be adopted in which a determination is made as to whether or not pattern light is required to be emitted based on determination results using a pre-image, and illumination photographing is performed only when the pattern light is determined to be required.

Figure 17:
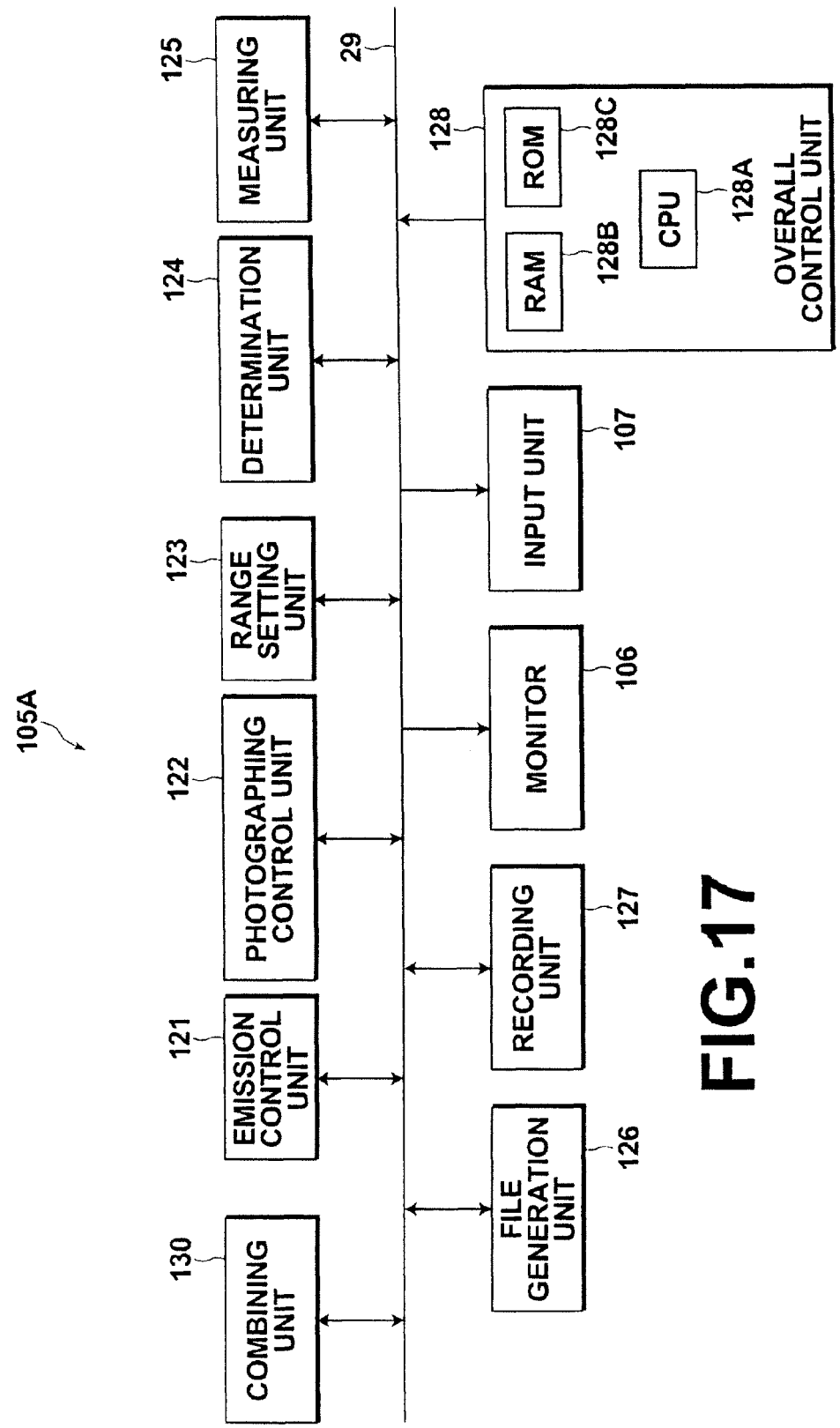
FIG. 17 is a schematic block diagram of the calculation unit of a sixth embodiment, illustrating the configuration thereof.

Next, a sixth embodiment of the present invention will be described. Sixth embodiment differs from the first to third embodiments only in the configuration of calculation unit 105. Therefore, only the configuration of calculation unit 105 will be described here. FIG. 17 illustrates a configuration of the calculation unit of a three-dimensional shape measuring system according to the sixth embodiment. As illustrated in FIG. 17, calculation unit 105A of a three-dimensional shape measuring system according to the sixth embodiment differs from the calculation unit of the third to fifth embodiments in that it further includes combining unit 130 for generating composite image C1 of non-illumination base image G11 and illumination base image G11', and composite image C2 of non-illumination reference image G12 and illumination reference image G12'.

Figure 18:
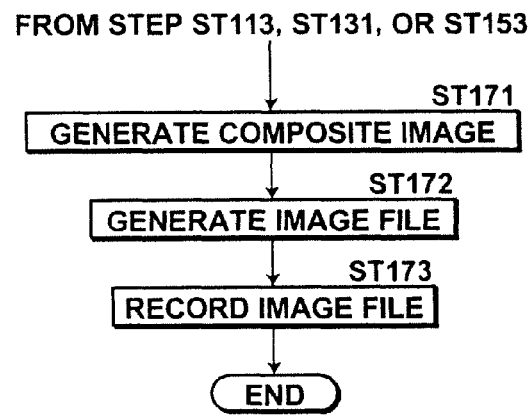
FIG. 18 is a flowchart illustrating a process performed in a sixth embodiment.

Next, a process performed in the sixth embodiment will be described. FIG. 18 is a flowchart of the process performed in the sixth embodiment. The process performed in the sixth embodiment differs from those performed in the third, fourth, and fifth embodiments only in the steps after step ST113 in the third embodiment, after step ST131 is determined to be positive in the fourth embodiment, and after step ST153 in the fifth embodiment. Therefore, only the steps following those will be described here.

Following step ST113 in the third embodiment, step ST131 in the fourth embodiment (determined to be positive), or step ST153 in the fifth embodiment, combining unit 130 generates composite image C1 of non-illumination base image G11 and illumination base image G11', and composite image C2 of non-illumination reference image G12 and illumination reference image G12' (step ST171).

Figure 19:
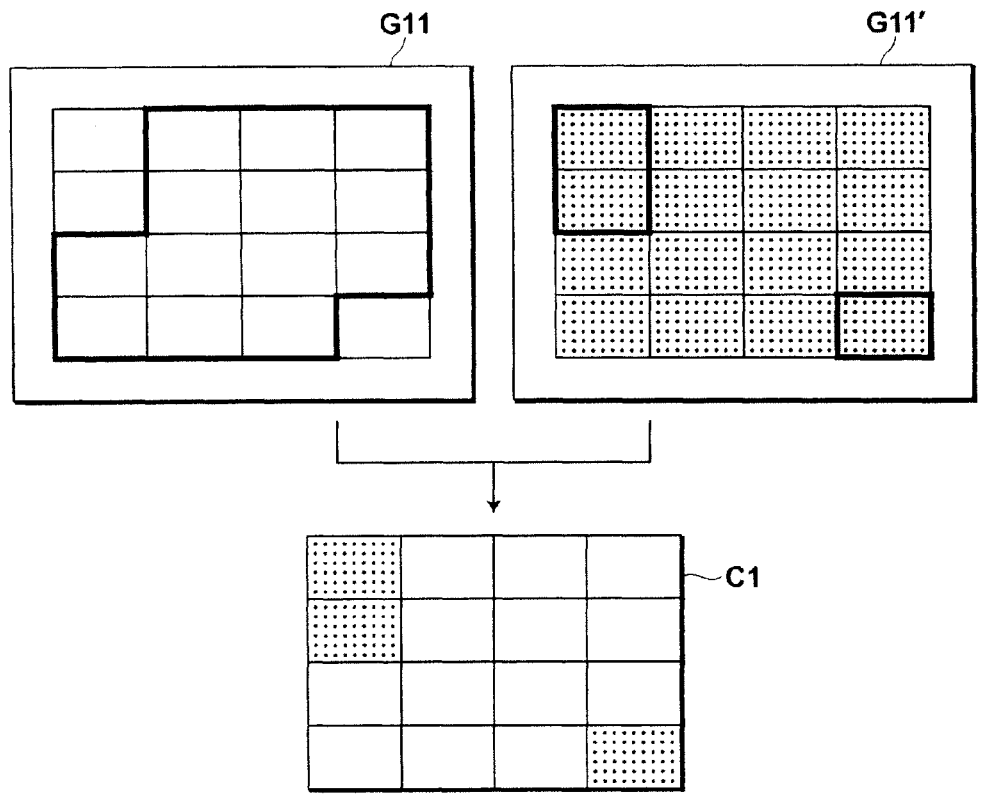
FIG. 19 illustrates generation of a composite image.
Figure 20:
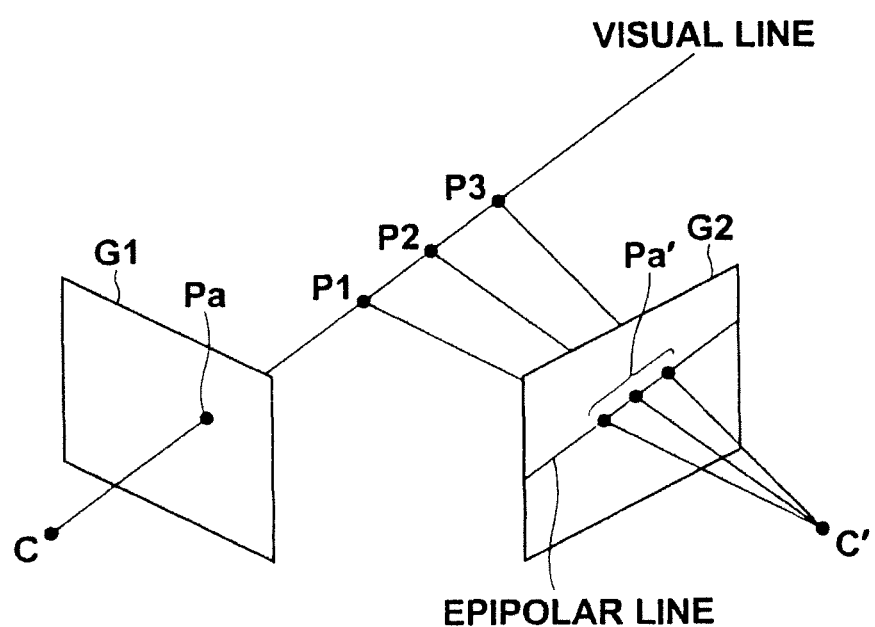
FIG. 20 illustrates pixel matching.

FIG. 19 illustrates generation of a composite image. The method for generating composite image C1 from non-illumination base image G11 and illumination base image G11' is identical to that for generating composite image C2 from non-illumination reference image G12 and illumination reference image G12'. Therefore, only the method for generating composite image C1 from non-illumination base image G11 and illumination base image G11' will be described here.

First, from a plurality of segments corresponding to illumination range R0 set on non-illumination base image G11, combining unit 130 extracts those set as non-illumination area. For example, when illumination areas and non-illumination areas are set like that shown in FIG. 13, the areas enclosed by a heavy line other than the areas (1, 1), (1, 2), and (4, 4) of non-illumination base image G11 are extracted. Further, from a plurality of segments corresponding to illumination range R0 set on illumination base image G11', combining unit 130 extracts those set as illumination areas. For example, when illumination areas and non-illumination areas are set like that shown in FIG. 13, areas of illumination base image G11' enclosed by heavy lines (1, 1), (1, 2), and (4, 4) are extracted. Then, combining unit 130 generates composite image C1 by combining the extracted areas. Here, non-illumination base image G11 and illumination base image G11' are obtained at different times, thus it is preferable to extract non-illumination and illumination areas and to combine them after correcting difference in the angle of view at the time of photographing between non-illumination base image G11 and illumination base image G11'.

From non-illumination reference image G12 and illumination reference image G12', composite image C2 is generated in the same manner as described above. Here, illumination range R0 is set on a pre-image or non-illumination base image G11, so that a region corresponding to illumination range R0 set on the pre-image or non-illumination base image G11 may be set on non-illumination reference image G12 or illumination reference image G12', and composite image C2 may be generated by extracting non-illumination areas and illumination areas from the region.

Thereafter, file generation unit 126 generates an image file from image data representing composite images C1, C2 (step ST172). Then, recording unit 127 records the image file on a medium (step ST173), and the process is completed.

As described above, in the sixth embodiment, non-illumination areas are extracted from non-illumination base image G11 and non-illumination reference image G12, and illumination areas are extracted from illumination base image G11' and illumination reference image G12', and extracted areas are combined to generate composite images C1, C2. Consequently, in composite images C1, C2, a portion having a high contrast or a local characteristic included in the angle of view is formed of an area not illuminated by pattern light. Therefore, even when a portion having a high contrast or a local characteristic is included in the angle of view, high quality composite images C1, C2 without a moiré and the like may be obtained and corresponding points may be obtained accurately, whereby a three-dimensional shape of the subject may be measured accurately.

Further, in the sixth embodiment, images used for generating an image file are only composite images C1, C2, so that the image file size may be reduced in comparison with the third to fifth embodiments.

So far three-dimensional shape measuring systems according to the first to sixth embodiments, but a program for causing a computer to function as means corresponding to photographing control units 22, 122, range setting units 23, 123, determination units 24, 124, measuring units 25, 125, luminance calculation unit 26, file generation unit 126, and combining unit 130, and to perform processes like that shown in FIGS. 6, 8, 9, 14, 15, 16, and 18 is another embodiment of the present invention. Further, a computer readable recording medium on which is recorded such a program is still another embodiment of the present invention.

What is claimed is:

1. A three-dimensional shape measurement photographing apparatus, comprising:
    a plurality of photographing units for obtaining, by photographing a subject, a measurement image group constituted by a plurality of measurement images for measuring a three-dimensional shape of the subject;
    an emission unit for emitting light, including pattern light, within an angle of view of the photographing units;
    a photographing control unit for controlling the photographing units to obtain a pre-image of the subject before obtaining the measurement image group and to obtain the measurement images of the subject illuminated by the pattern light;
    a determination unit for setting a plurality of areas on the pre-image and determining, for each of the areas, whether to emit the pattern light; and
    an emission control unit for controlling the emission unit such that the pattern light is emitted only to an area for which a determination has been made to emit the pattern light.

2. The three-dimensional shape measurement photographing apparatus of claim 1, wherein:
    the apparatus further comprises a luminance calculation unit for calculating a luminance of the pre-image for each of the plurality of areas; and
    the emission control unit is a unit that controls the emission unit such that the amount of light emitted to the subject is changed for each of the areas according to the luminance.

3. The three-dimensional shape measurement photographing apparatus of claim 2, wherein the emission control unit is a unit that controls the emission unit such that the pattern light having a predetermined luminance is emitted to an area having a luminance not greater than a predetermined value among the plurality of areas.

4. The three-dimensional shape measurement photographing apparatus of claim 1, further comprising a measuring unit for measuring the three-dimensional shape of the subject based on the measurement image group of the subject illuminated by the pattern light.

5. A three-dimensional shape measurement photographing method for use with a three-dimensional shape measurement photographing apparatus that includes a plurality of photographing units for obtaining, by photographing a subject, a measurement image group constituted by a plurality of measurement images for measuring a three-dimensional shape of the subject, and an emission unit for emitting light, including pattern light, within an angle of view of the photographing units, the method comprising the steps of:
    obtaining a pre-image of the subject before obtaining the measurement image group;
    setting a plurality of areas on the pre-image and determining, for each of the areas, whether to emit the pattern light;
    emitting the pattern light only to an area for which a determination has been made to emit the pattern light;
    obtaining the measurement images of the subject illuminated by the pattern light; and
    measuring the three-dimensional shape of the subject based on the measurement images.

6. A computer readable recording medium on which is recorded a program for causing a computer to perform a three-dimensional shape measurement photographing method for use with a three-dimensional shape measurement photographing apparatus that includes a plurality of photographing units for obtaining, by photographing a subject, a measurement image group constituted by a plurality of measurement images for measuring a three-dimensional shape of the subject, and an emission unit for emitting light, including pattern light, within an angle of view of the photographing units, the method comprising the steps of:
    obtaining a pre-image of the subject before obtaining the measurement image group;
    setting a plurality of areas on the pre-image and determining, for each of the areas, whether to emit the pattern light;
    emitting the pattern light only to an area for which a determination has been made to emit the pattern light.
    obtaining the measurement images of the subject illuminated by the pattern light; and
    measuring the three-dimensional shape of the subject based on the measurement images.

7. A three-dimensional shape measurement photographing apparatus, comprising:
    a plurality of photographing units for obtaining, by photographing a subject, a measurement image group constituted by a plurality of measurement images for measuring a three-dimensional shape of the subject;
    an emission unit for emitting pattern light within an angle of view of the photographing units;
    a photographing control unit for controlling the plurality of photographing units to obtain a pre-image of the subject or to obtain a first measurement image group constituted by a plurality of first measurement images of the subject not illuminated by the pattern light; and
    a determination unit for setting a plurality of areas on the pre-image or at least on one of the first measurement images and determining, for each of the areas, whether to emit the pattern light.

8. The three-dimensional shape measurement photographing apparatus of claim 7, further comprising a storage unit for storing a result of the determination.

9. The three-dimensional shape measurement photographing apparatus of claim 7, wherein:
the apparatus further comprises an emission control unit that controls the emission unit to emit pattern light to the subject; and
the photographing control unit is a unit that controls the photographing units to obtain a second measurement image group constituted by a plurality of second measurement images of the subject illuminated by the pattern light.

10. The three-dimensional shape measurement photographing apparatus of claim 7, wherein:
the apparatus further comprises an emission control unit that controls the emission unit to emit pattern light to the subject; and
the photographing control unit is a unit that controls the photographing units to obtain the second measurement image group constituted by a plurality of second measurement images of the subject illuminated by the pattern light, if an area for which a determination has been made to emit the pattern light is present.

11. The three-dimensional shape measurement photographing apparatus of claim 9, further comprising a measuring unit for measuring the three-dimensional shape based on the first and second measurement image groups.

12. The three-dimensional shape measurement photographing apparatus of claim 9, further comprising a combining unit for extracting a non-illumination area for which a determination has been made not to emit the pattern light from the first measurement image group and an illumination area for which a determination has been made to emit the pattern light from the second measurement image group, and generating a composite image group constituted by a plurality of composite images from the non-illumination area and illumination area extracted from the first and second measurement image groups corresponding to each other.

13. The three-dimensional shape measurement photographing apparatus of claim 12, further comprising a measuring unit for measuring the three-dimensional shape of the subject based on the composite image group.

14. A three-dimensional shape measurement photographing method for use with a three-dimensional shape measurement photographing apparatus that includes a plurality of photographing units for obtaining, by photographing a subject, a measurement image group constituted by a plurality of measurement images for measuring a three-dimensional shape of the subject and an emission unit for emitting pattern light within an angle of view of the photographing units, the method comprising the steps of:
obtaining a pre-image of the subject or a first measurement image group constituted by a plurality of first measurement images of the subject not illuminated by the pattern light; and
setting a plurality of areas on the pre-image or at least on one of the first measurement images and determining, for each of the areas, whether to emit the pattern light.

15. A computer readable recording medium on which is recorded a program for causing a computer to perform a three-dimensional shape measurement photographing method for use with a three-dimensional shape measurement photographing apparatus that includes a plurality of photographing units for obtaining, by photographing a subject, a measurement image group constituted by a plurality of measurement images for measuring a three-dimensional shape of the subject and an emission unit for emitting pattern light within an angle of view of the photographing units, the method comprising the steps of
obtaining a pre-image of the subject or a first measurement image group constituted by a plurality of first measurement images of the subject not illuminated by the pattern light; and
setting a plurality of areas on the pre-image or at least on one of the first measurement images and determining, for each of the areas, whether to emit the pattern light.

* * * * *